(12) United States Patent
King et al.

(10) Patent No.: US 6,399,731 B2
(45) Date of Patent: *Jun. 4, 2002

(54) CHAIN TRANSFER AGENTS AND ITS USE IN POLYMER SYNTHESIS

(75) Inventors: Brian King, Akron; H. James Harwood, Stow, both of OH (US)

(73) Assignee: The University of Akron, Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,116

(22) Filed: Dec. 2, 1998

Related U.S. Application Data
(60) Provisional application No. 60/103,532, filed on Oct. 8, 1998.

(51) Int. Cl.[7] .............................. C08J 220/10; C08J 4/06
(52) U.S. Cl. .................... 526/318.4; 526/100; 526/139; 526/72; 526/292.5; 526/317.1; 526/233; 526/281
(58) Field of Search .............................. 526/318.4, 100, 526/139, 72, 292.5, 233, 317.1, 281

(56) References Cited

U.S. PATENT DOCUMENTS

| | | | |
|---|---|---|---|
| 5,362,826 A | 11/1994 | Berge et al. | 525/377 |
| 5,371,151 A | 12/1994 | Berge et al. | 526/194 |
| 5,681,479 A | 10/1997 | Kerr et al. | 210/699 |
| 5,932,675 A | 8/1999 | Rizzardo et al. | 526/289 |

FOREIGN PATENT DOCUMENTS

| | | | |
|---|---|---|---|
| EP | 033378 B1 | 2/1995 | |
| WO | WO95/12568 A | 5/1995 | C07C/69/604 |
| WO | WO 98/01478 | 1/1998 | |
| WO | WO88043604 A | 6/1998 | C08F/2/38 |

OTHER PUBLICATIONS

Kazuko et al. Makromol. Chem. (1978), 179 (7), 1753–63.*
Levin et al. "Vysokomol. Soedin.", Ser. a (1975), 17(4), 845–54, 1978.*

"Chain Transfer Activity of Some Activated Allylic Compounds", Meijs et al., *Polymer Bulletin* 24, pp. 501–505, 1990.

"New Method in Free Radical Chemistry Using 2,4–Diphenyl–4–methyl–1–pentene as Radical Trapping Agent", Watanabe et al., *Polymer Journal*, vol. 29, No. 4, pp. 366–369, (1997).

"Chain Transfer by Radical Addition–Frangmentation Mechanisms: Synthesis of Macromonomers and End–Funcitonal Oligomers", Rizzardo et al., *Macromol. Symp.* 98, pp. 101–123, 1995.

"Homo– and Copolymerization of Vinyl Phosphates and Phosphonates" Marray, *J. Polym. Sci., Polym. Symp.*, Part C, No. 16, pp. 1869–1886, 1967.

"Copolymerization of Diethyl α–Phenylvinyl Phosphate with Acrylonitrile and Maleic Anhydride" by Jin et al., *Journal of the Korean Chemical Society*, pp. 288–293 (1983).

"Synthesis fo α–, and γ–Ketophosphonate Polymer–Supported Reagents: The Role of Intra–ligand Cooperation in the Complexation of Metal Ions" by Alexanderatos et al. *Macromoleclules* 31, pp. 3235–3238 (1998).

* cited by examiner

*Primary Examiner*—David W. Wu
*Assistant Examiner*—Tanya Zalukaeva
(74) *Attorney, Agent, or Firm*—Renner, Kenner, Greive, Bobak, Taylor & Weber

(57) ABSTRACT

A method for making a polymer comprising the step of synthesizing a polymer by employing a chain transfer agent having the formula (II)

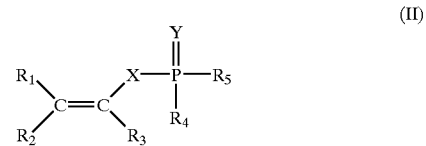

(II)

where X and Y are independently selected from oxygen, sulfur, and fully-substituted nitrogen where $R_1$ and $R_2$ are independently selected from hydrogen, halogen, or an organic group, with the proviso that at least one of $R_1$ or $R_2$ be hydrogen or halogen, $R_3$ is an organic group $R_4$ and $R_5$ are independently selected organic groups, with the proviso that $R_3$ is not hydrogen.

4 Claims, 10 Drawing Sheets

CHAIN TRANSFER AGENTS AND ITS USE IN POLYMER SYNTHESIS

This application claims the benefit of pending U.S. Provisional Patent Application No. 60/103,532, filed on Oct. 8, 1998.

This invention was made with government support under a grant awarded by The National Science Foundation. The government may have certain rights to the invention.

TECHNICAL FIELD

This invention relates to chain transfer agents useful in free radical polymerization. Specifically, the present invention is directed toward addition-fragmentation, phosphorus-containing chain transfer agents. These agents are conveniently synthesized by the Perkow reaction.

BACKGROUND OF THE INVENTION

Chain transfer agents are moieties that react with a growing polymer radical, causing the growing chain to terminate while creating a new reactive species capable of initiating polymerization. Chain transfer agents are useful for controlling the molecular weights of polymers, for reducing gelation when polymerizations and copolymerizations involving diene monomers are conducted, and for preparing polymers and copolymers with useful chemical functionality at their chain ends. The latter application requires that the chain transfer agent be appropriately substituted with the desired chemical functionality. Molecules with multiple chain transfer functionalities can be used for the synthesis of complicated polymer architectures such as block copolymers, graft copolymers, and polymers with star structures.

Most chain transfer agents contain carbon-halogen, sulfur-hydrogen, silicon-hydrogen, or sulfur-sulfur bonds. Except for those that have sulfur-sulfur bonds, these agents cannot be designed to impart useful chemical functionality at both ends of a polymer chain. The most widely used chain transfer agents contain sulfur-hydrogen bonds and are known as mercaptans. The lower molecular weight agents, such as butyl mercaptan, have the disadvantage of being very odiferous. The higher molecular weight agents have the disadvantage of being expensive.

Another disadvantage of the chain transfer agents of the prior art is that their reactivities toward growing polymer radicals are usually considerably different than the reactivities of the monomers involved in the polymerizations. This makes it difficult to obtain uniform products.

A relatively new class of chain transfer agents for free radical polymerization and copolymerization reactions include "addition-fragmentation" reagents that add to a growing polymer and the resulting adduct fragments to form a stable polymer molecule and a new free radical that is able to initiate the polymerization of a new polymer molecule. The addition-fragmentation polymerization of styrene in the presence of α-benzyloxystyrene, for example, is shown in FIG. 1.

As another example, many addition-fragmentation reagents cause polymerization reactions to yield macromonomers, which are polymers that contain at their end a group that is capable of polymerizing with other monomers. An example of this is the polymerization of styrene in the presence of the dimer of methyl methacrylate. This occurs as shown in FIG. 2, yielding a product with a reactive double bond at its chain end. Copolymerization of this macromonomer with an acrylate ester, for example, can yield an acrylate polymer with a polystyrene graft, as also shown in FIG. 2. The macromonomer can also behave as a macrotransfer agent and yield a block copolymer.

Many prior art addition/fragmentation chain transfer agents, however, contain allylic hydrogens. These substituents cause the reagents to be sensitive to oxidation during storage. Also, allylic hydrogens can participate in chain transfer reactions that compete with the addition-fragmentation capability of the reagents.

Another drawback to many of the addition-fragmentation chain transfer agents known heretofore in the art is the synthesis of the compounds. That is, many prior art chain transfer agents can only be prepared by expensive, tedious, and dangerous procedures. Indeed, some compounds can only be prepared by using organomercury compounds. For example, α-benzyloxystyrene, which has been used as a chain transfer agent, is very difficult to synthesize inasmuch as known synthesis techniques require an organomercury catalyst that leads to health and disposal problems.

Thus, there is a need for improved chain transfer agents, especially addition-fragmentation chain transfer agents, that do not suffer from many of the drawbacks associated with chain transfer agents known heretofore in the art.

SUMMARY OF INVENTION

It is therefore an object of the present invention to provide a new class of chain transfer agents that are useful for controlling the molecular weights, end functionality, and structures of polymers.

It is another object of the present invention to provide a method for chain transfer during free radical polymerization using novel reagents.

It is a further object of the present invention to provide a new class of polymers with phosphorus-containing end groups.

It is another object of the present invention to provide polymers with improved homogeneity and a method for preparing the same.

It is yet another object of the present invention to provide addition-fragmentation reagents that have little or no noxious odor.

It is still another object of the present invention to provide chain transfer agents for free radical polymerization that are easy and economical to synthesize and versatile in their applications.

It is a further object of the present invention is to provide a new class of chain transfer agents whose reactivities can be tailored to be similar to those of the monomers being employed during polymerization; this will advantageously result in the monomer and chain transfer agent being consumed together at the same or similar rates.

It is another object of the present invention to provide a new class of chain transfer agents that are polymeric in nature and thereby are useful in the synthesis of polymers and copolymers having a wide range of molecular architectures.

At least one or more of the foregoing objects, together with the advantages thereof over the known art relating to chain transfer agents, which shall become apparent from the specification that follows, are accomplished by the invention as hereinafter described and claimed.

In general the present invention provides a method for making a polymer comprising the step of synthesizing a polymer by employing a chain transfer agent having the formula (II)

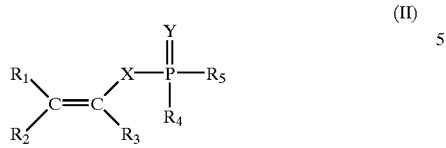

where X and Y are independently selected from oxygen, sulfur, and fully-substituted nitrogen where $R_1$ and $R_2$ are independently selected from hydrogen, halogen, or an organic group, with the proviso that at least one of $R_1$ or $R_2$ be hydrogen or halogen, $R_3$ is an organic group, $R_4$ and $R_5$ are independently selected organic groups.

The present invention also includes a method for making a polymer comprising the step of synthesizing a polymer by employing a chain transfer agent having the formula (I)

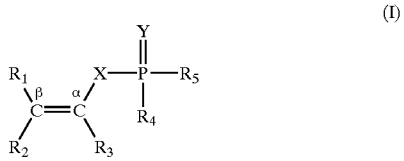

where Y is selected from oxygen, sulfur, and fully-substituted nitrogen, X is selected from oxygen, sulfur, and fully-substituted nitrogen, $R_1$, $R_2$ and $R_3$ are independently selected from moieties that will allow the β carbon to have a high reactivity with a free radical, and $R_4$ and $R_5$ are independently selected moieties.

The present invention further includes a polymerization process comprising the steps of initiating a free radical polymerization, and effecting chain transfer with a reagent selected from the group including vinyl esters of a phosphorus containing acid, vinyl thioesters of a phosphorus acid, vinyl amides of a phosphorus acid, vinyl esters of a thiophosphorus acid, vinyl thio esters of a thiophosphorus acid, and vinyl amides of a thiophosphorus acid.

The present invention still further includes a method of controlling the molecular weight of polymers resulting from a free radical polymerization including the step of carrying out a free radical polymerization in the presence of a chain transfer agent having the formula (II)

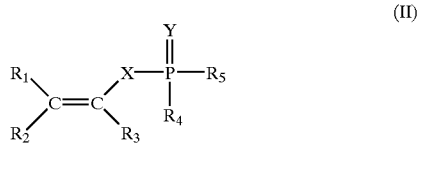

where X and Y are independently selected from oxygen, sulfur, and fully-substituted nitrogen where $R_1$ and $R_2$ are independently selected from hydrogen, halogen, or an organic group, with the proviso that at least one of $R_1$ or $R_2$ be hydrogen or halogen, $R_3$ is an organic group, $R_4$ and $R_5$ are independently selected organic groups.

The present invention also includes a chain transfer agent having the formula (II)

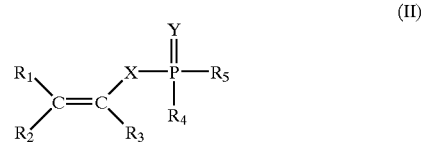

where X and Y are independently selected from oxygen, sulfur, and fully-substituted nitrogen where $R_1$ and $R_2$ are independently selected from hydrogen, halogen, or an organic group, with the proviso that at least one of $R_1$ or $R_2$ be hydrogen or halogen, $R_3$ is an organic group, $R_4$ and $R_5$ are independently selected organic groups.

PREFERRED EMBODIMENT FOR CARRYING OUT THE INVENTION

Figure 1:
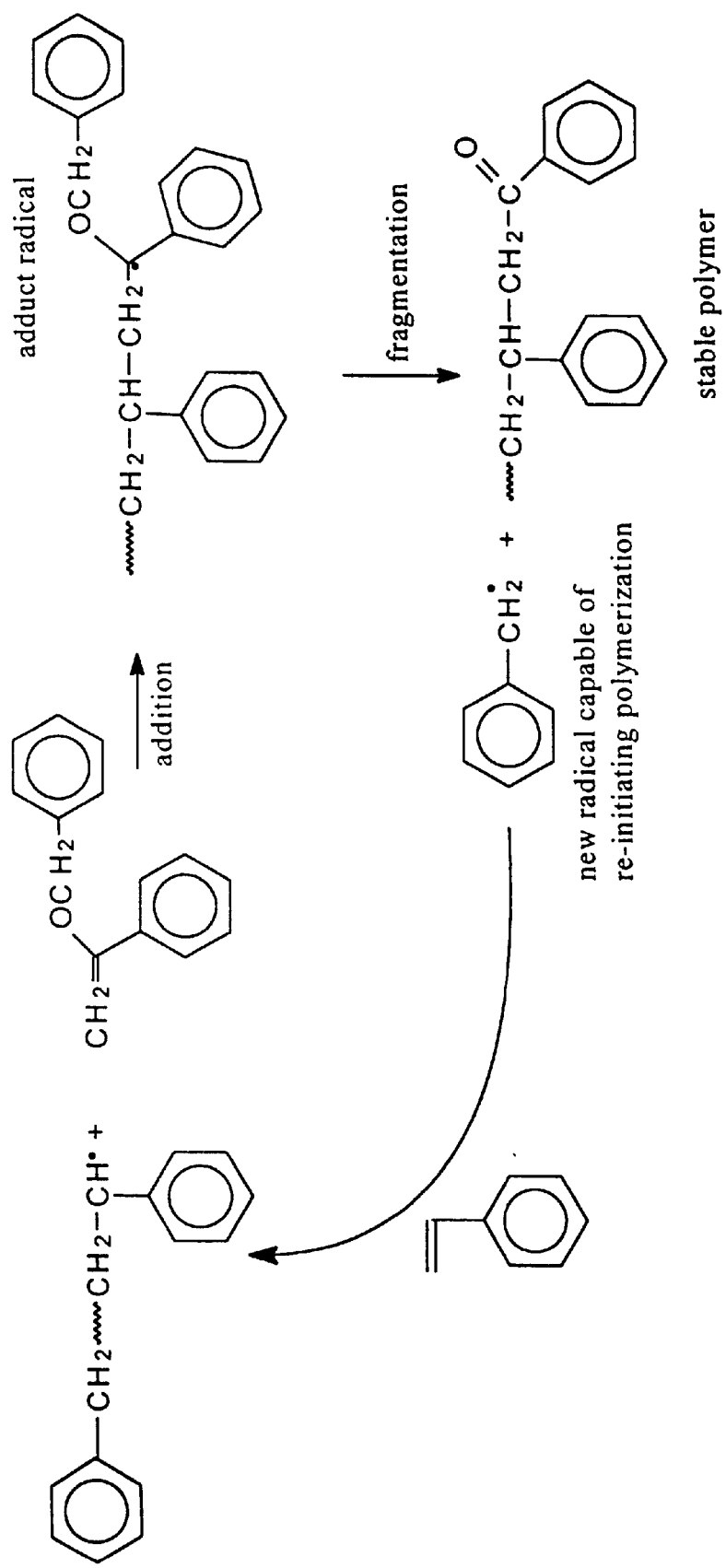
FIG. 1 depicts an addition-fragmentation polymerization reaction of styrene in the presence of α-benzyloxystyrene.
Figure 2:
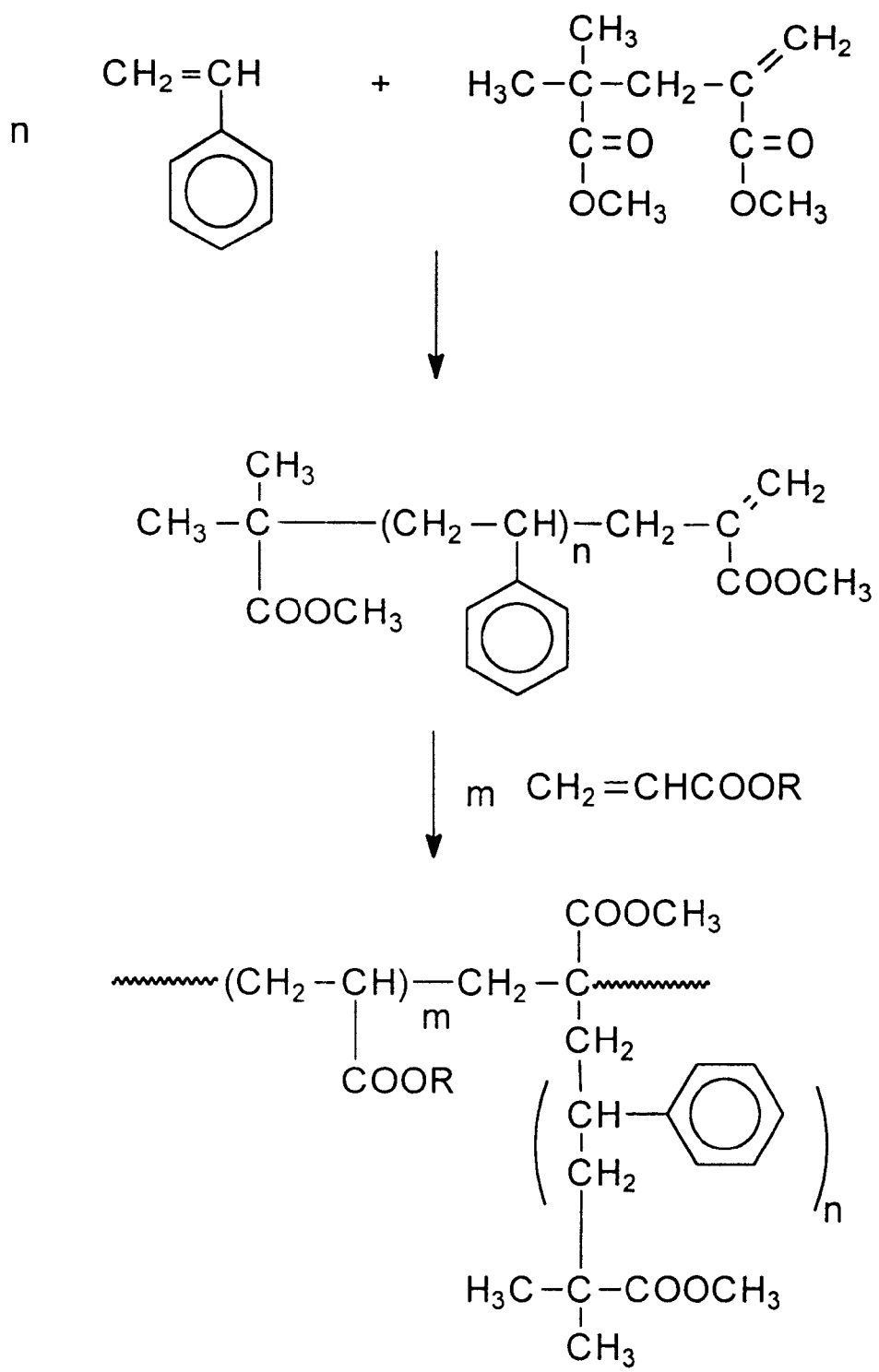
FIG. 2 depicts the polymerization of styrene in the presence of a dimer of methyl methacrylate.

It has now been discovered that a new class of compounds are highly effective as chain transfer agents for use in free radical polymerization. These novel chain transfer agents can generally be defined by the formula (I)

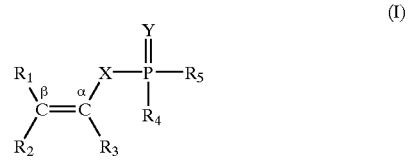

where X and Y are independently selected from oxygen, sulfur, or fully-substituted nitrogen, $R_1$, $R_2$, and $R_3$ are independently selected substituent groups that allow the β carbon to be rapidly reacted with a free radical during free radical polymerization, $R_4$ and $R_5$ are independently selected substituent groups that will not deleteriously affect the chain transfer capability of the compound. By rapidly reacted, it should be understood that the rate of reaction should be comparable to the rate of polymerization of the monomers being reacted in the free radical polymerization. Preferably, a comparable rate of polymerization is within one order of magnitude of the rate of the free radical polymerization being carried out. The skilled artisan will readily recognize that the substituents $R_1$, $R_2$, and $R_3$ can impact the reactivity of the β carbon with a free radical. Namely, $R_1$ and $R_2$ can offer steric hindrance to radicals and thereby diminish the reactivity of the chain transfer agent. For this reason, it is preferred that at least one of $R_1$ or $R_2$ include a small atom such as hydrogen or a small halogen such as fluorine. When a small atom such as hydrogen or fluorine is present for $R_1$ or $R_2$, the remaining $R_1$ or $R_2$ substituent can be selected from a host of groups. For example, $R_1$ or $R_2$ can include a vinyl or substituted vinyl group that will yield a conjugated 1,3-diene compound that would be a very reactive chain transfer agent. $R_3$ is preferably a group or moiety that can facilitate the reactivity of the chain transfer agent toward free radicals. It is well known that aromatic groups, such as phenyl, substituted phenyl, naphthyl, substituted naphthyl, pyridyl groups etc., carbonyl groups of aldehydes, ketones and esters, heterocyclic groups, isocyanate groups, etc., have this capability, and the skilled artisan will have no difficulty recognizing these groups. The substituent $R_3$ can also include a group or moiety that will be present at one chain end of the polymer that results from the chain transfer reaction. The skilled artisan will also recognize that the substituents $R_4$ and $R_5$ can impact chain transfer because they can influence the stability of the phosphorus-centered radical that results from the fragmentation step and thus influence the ease of the fragmentation step. If the groups $R_4$ and $R_5$ have large steric requirements, they can hinder the reaction of the chain transfer agent with a radical, but once radical addition has occurred, the fragmentation step will be enhanced. The term fully substituted nitrogen shall refer to a nitrogen atom that is not substituted with a hydrogen atom. As the skilled artisan will recognize, the nitrogen atom can be alkylated, arylated, or substituted with various organic groups as defined herein.

Based upon the foregoing instruction, it is well within the ability of the skilled artisan to select substituents for the groups $R_1$, $R_2$, $R_3$, $R_4$, and $R_5$ without undue experimentation. As will become evident hereinbelow, there are a host of starting reactants, many of which are commercially available, that can be selected to prepare various species of the genus of compounds defined by the formula I. The skilled artisan will likewise appreciate the benefit of certain substituents for $R_1$, $R_2$, $R_3$, $R_4$, and $R_5$, as the substituents may impart special reactivity toward particular types of polymer radicals, or may impart a capability to prepare useful chemical functionalities at the ends of the polymers, or even a means to construct particular polymer architectures such as block and graft copolymers, dendrimers, etc. For example, the substituent $R_3$ may be selected to impart chemical functionality to an end of a polymer that is formed when the chain transfer agent of the present invention is employed. $R_3$ may also be a group that connects the remaining substituents of the chain transfer agent to a polymer chain in a macrofer, which is a polymeric chain transfer agent. Still further, $R_3$ will have a large affect on the reactivity of the chain transfer agent toward polymer radicals and can be selected to enhance the reactivity of the chain transfer agent toward particular types of polymer radicals. For example, when the monomer being polymerized has a high electron affinity, such as an acrylate ester or acrylonitrile, it is desirable that $R_3$ be an electron-donating group such as a phenyl group. Conversely, when the monomer has a low ionization potential, such as styrene or a vinyl ether, it is desirable that $R_3$ be an electron-accepting group such as a cyano group. $R_4$ and $R_5$ can be selected with the intent of functionalizing the end of the resulting polymer, as it should be appreciated from this written description that upon chain transfer, the substituents $R_4$ and $R_5$ will be located at one terminal end of the resulting polymer.

The skilled artisan will also be able to select various useful and preferred substituents based upon the environment in which the free radical polymerization is conducted. For example, the substituents may be selected as a function of the solvent employed because the substituents selected can impact the solubility of the chain transfer agent in various solvents.

In one embodiment of the present invention, the novel chain transfer agents can be selected from vinyl esters of phosphorus-containing acids, vinyl thio esters of phosphorus-containing acids, vinyl amides of phosphorus-containing acids, vinyl esters of thio phosphorus-containing acids, vinyl thio esters of thiophosphorus-containing acids, and vinyl amides of thio phosphorus-acids. It should be understood that for purposes of this embodiment, the term vinyl is generally used and therefore shall include those vinyl based substituents that are substituted, so long as the substitution will not adversely affect the performance of the chain transfer agent. The skilled artisan will be able to readily select a host of substituents that can be employed to substitute the vinyl substituent within the scope of the above description.

In a preferred embodiment of the present invention, the novel chain transfer agents are defined by the formula (II)

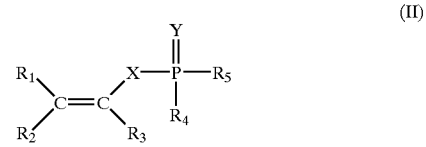

(II)

where X and Y are independently selected from oxygen, sulfur or fully-substituted nitrogen, and $R_1$, $R_2$, and $R_3$ are independently selected from organic groups, with the proviso that at least one of $R_1$ or $R_2$ is selected from hydrogen and halogen, $R_4$ and $R_5$ are independently selected from halogen, and organic groups. Preferably, $R_4$ and $R_5$ are organic groups. The term fully-substituted nitrogen shall be the same as above. Preferably, at least one of $R_1$ and $R_2$ is selected from hydrogen and fluorine.

Non-limiting examples of organic groups or moieties for $R_1$ and/or $R_2$ include vinyl, alkoxy, substituted alkoxy, aryloxy, substituted aryloxy, 1-styryl, 1-chlorovinyl, 1-fluorovinyl, nitrile, ester(i.e.,—COOR), 1-phenylvinyl, aldehyde, and ketone groups. Non-limiting examples of organic groups for $R_3$ include vinyl, substituted vinyl, phenyl, substituted phenyl, naphthyl, substituted naphthyl, ester (i.e.,—COOR), nitrile, ketone, aldehyde, heterocyclic, amide, and carboxylic acid groups. And, non-limiting examples of organic groups for $R_4$ and/or $R_5$ include alkyl, aryl, alkoxy, substituted alkoxy, aryloxy, substituted aryloxy, substituted alkyl, substituted aryl, dialkylamino, alkylthio hydroxyl, and arylthio.

Specific examples of those chain transfer agents defined by the formulas (I) and (II) include, for example and without limitation, α-diphenylphosphinyl oxystyrene, diethyl α-styryl phosphate, diphenyl 1-(phenylketovinyl) phosphate, α-(methoxy phenylphosphonyloxy)-p-chlorostyrene, phenyl α-diphenylphosphinyloxyacrylate, and 2-propenyl diphenylphosphinate. These compounds can be represented by the following formulas:

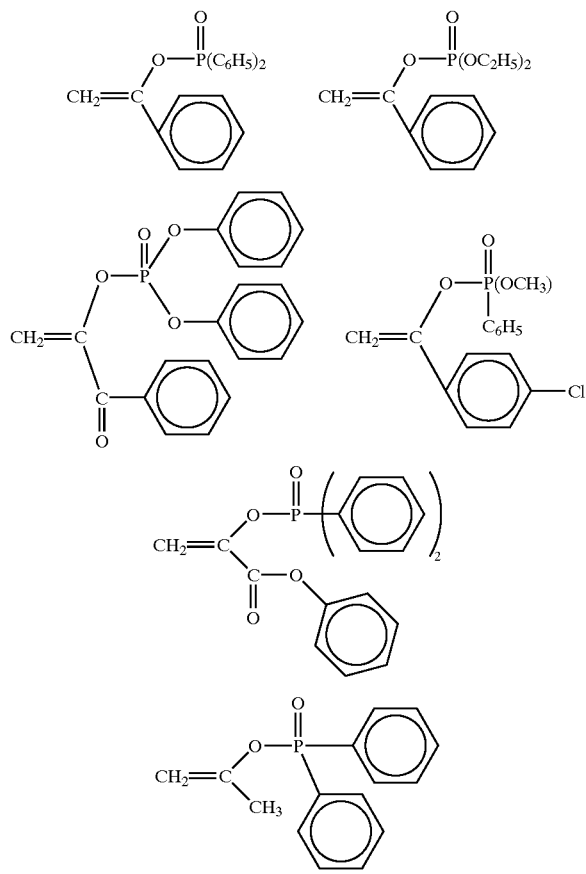

It should also be understood that the substituents $R_1$, $R_2$, $R_3$, $R_4$, and $R_5$ can contribute to a cyclic species. For example, the joining of $R_4$ and $R_5$ contribute to the following compounds:

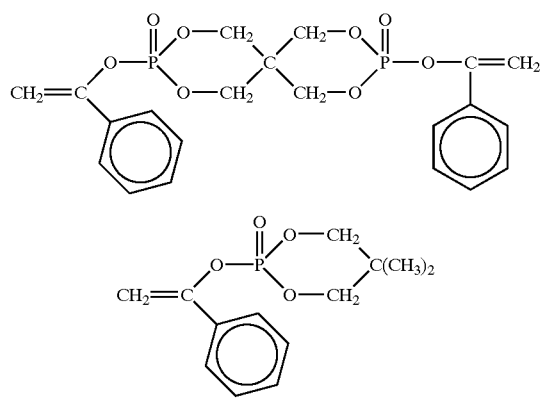

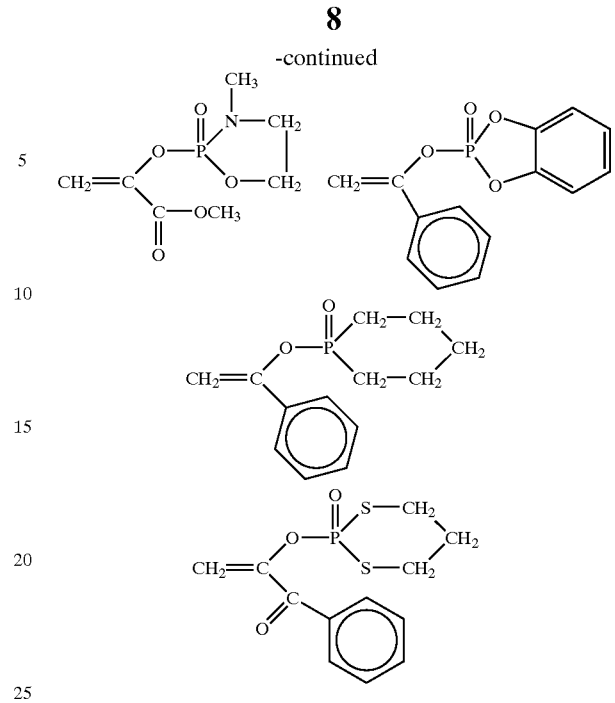

Likewise, $R_2$ and $R_3$ can connect and form the following exemplary compounds:

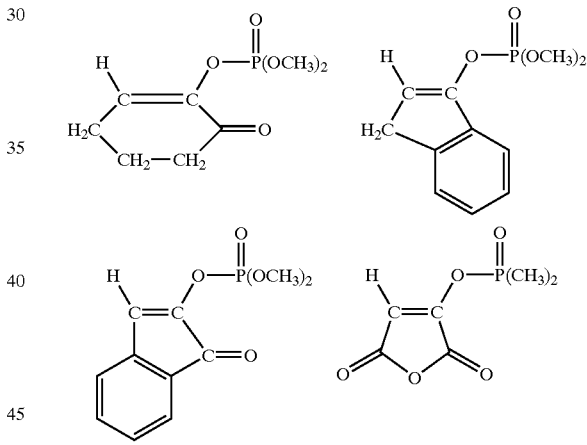

It should be understood that chain transfer agents defined by the formulas (I) and (II) include various multi-functional chain transfer agents. For example, where $R_3$ is attached to a multi-valent substituent, the chain transfer agents of the present invention can include those defined by the formula (III)

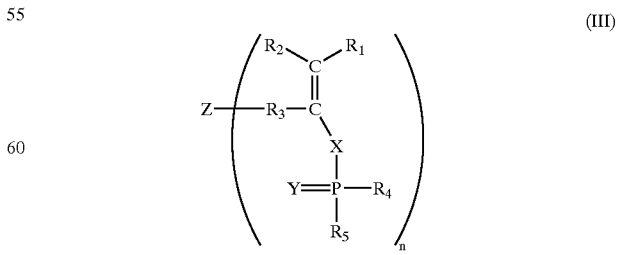

where Z is a multi-valent atom or moiety, $R_3$ is a bond, a divalent atom, or divalent moiety, $R_1$, $R_2$, $R_4$, and $R_5$ are defined as above for formula (II), X and Y are defined as above, and n is an integer from 2 to about 20. Non-limiting examples of multi-valent atoms or moieties that are useful for the substituent Z include silicon, carbon, boron, nitrogen, oxygen, sulfur, a polymer backbone, a triazine or other heterocyclic ring, and an aromatic ring. Non-limiting examples of divalent atoms or moieties that are useful for $R_3$ include disubstituted carbon, oxygen, disubstituted silicon, o-, m-, or p-phenylene, o-, m-, or p-substituted phenylene, o-, m-, or p-oxyphenylene, phenyleneoxyphenylene, ethyleneoxycarbonyl, 2,6-napthylene, phenyleneoxycarbonyl, ethylenecarbonyl, phenylenecarbonyl, alkenylamide, phenylenyl, substituted aryloxy, and heterocyclic amide groups.

In another example, where $R_4$ or $R_5$ include a multi-valent substituent, the chain transfer agents of the present invention can include those defined by the formula (IV)

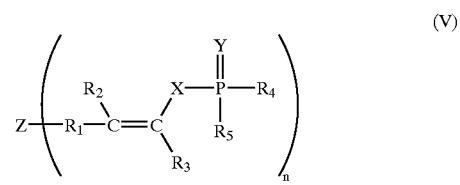

(IV)

where Z is a multi-valent atom or moiety, $R_4$ is a bond, divalent atom, or divalent moiety, $R_1$, $R_2$, $R_3$ and $R_5$ are defined as above for formula (II), X and Y are defined as above, and n is an integer from 2 to about 20. Non-limiting examples of multi-valent atoms or moieties that are useful for the substituent Z include silicon, carbon, boron, nitrogen, oxygen, sulfur, a polymeric backbone, a triazine or other heterocyclic ring, and an aromatic ring. And, non-limiting examples of organic groups for $R_1$ include disubstituted carbon, oxygen, disubstituted silicon, o-, m-, p-phenylene, substituted o-, m-, or p-substituted phenylene, o-, m-, or p-oxyphenylene, phenyleneoxyphenylene, ethyleneoxycarbonyl, 2,6-napthylenyl, phenyleneoxycarbonyl, ethylenecarbonyl, phenylenecarbonyl, alkenylamide, phenylenyl amide, substituted aryloxy, and heterocyclic groups. It should be understood that multi-valent substituent can include $R_4$ or $R_5$ inasmuch as an analogous or equivalent compound will result in either situation.

In another example, where $R_1$ or $R_2$ include a multi-valent substituent, the chain transfer agents of the present invention can include those defined by the formula (V)

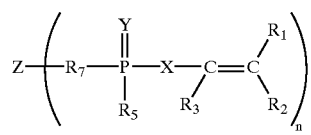

(V)

where Z is a multi-valent atom or moiety, $R_1$ is a bond, divalent atom, or divalent moiety, $R_2$, $R_3$, $R_4$ and $R_5$ are defined as above for formula (II), X and Y are defined as above, and n is an integer from 2 to about 20. Non-limiting examples of multi-valent atoms or moieties that are useful for the substituent Z include silicon, carbon, boron, nitrogen, oxygen, sulfur, a polymeric backbone, a triazine or other heterocyclic ring, and an aromatic ring. And, non-limiting examples of organic groups for $R_4$ include disubstituted carbon, oxygen, disubstituted silicon, o-, m-, p-phenylene, substituted o-, m-, or p-substituted phenylene, o-, m-, or p-oxyphenylene, phenyleneoxyphenylene, ethyleneoxycarbonyl, 2,6-napthylenyl, phenyleneoxycarbonyl, ethylenecarbonyl, phenylenecarbonyl, alkenylamide, phenylenyl amide, substituted aryloxy, and heterocyclic groups. It should be understood that multi-valent substituent can be positioned at either $R_1$ or $R_2$ inasmuch as both structures are equivalent and/or analogous; the only difference lies in the formation of a cis or trans structure.

Specific examples of those chain transfer agents defined by the formulas (III) and (IV) include, for example and without limitation, structures such as:

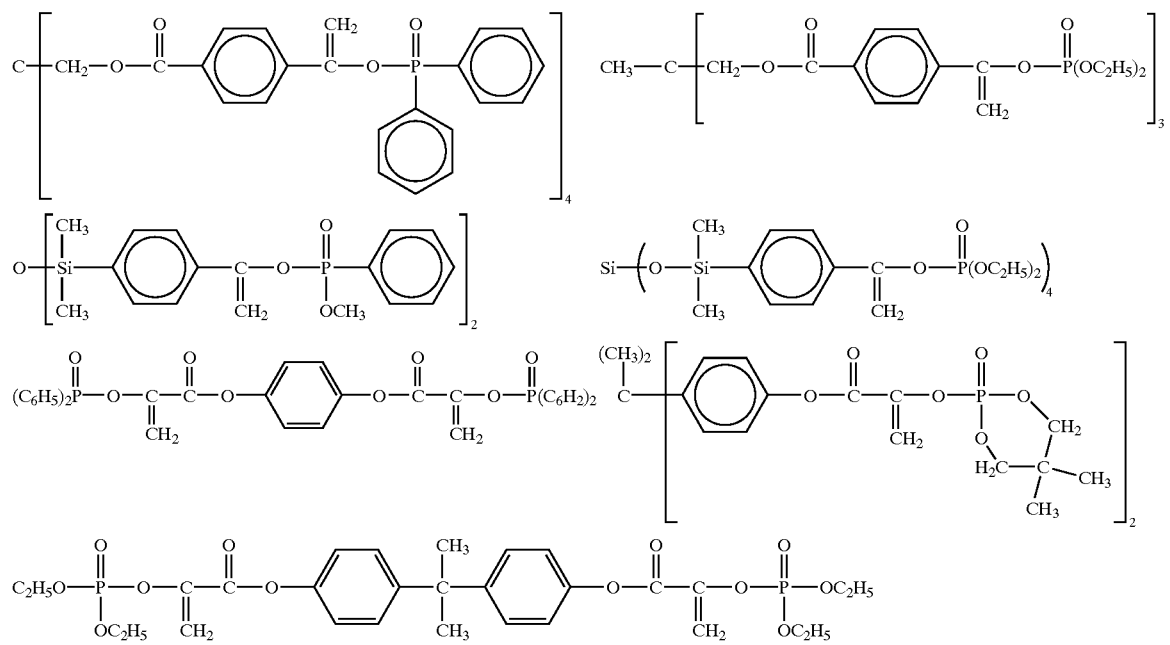

-continued

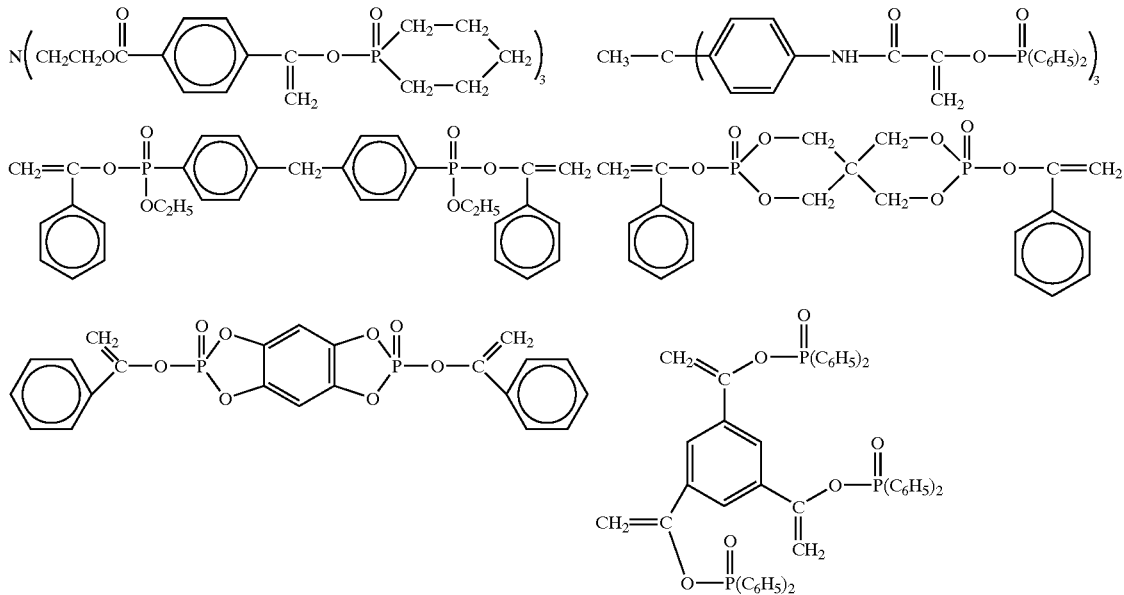

In another embodiment of the present invention the chain transfer agents of the present invention are polymeric in nature. In other words, at least one of $R_1$, $R_2$, $R_3$, $R_4$, or $R_5$ of formulas (I) or (II) are divalent substituents linking the agent to a polymer, or $R_1$, $R_2$, $R_3$, $R_4$, or $R_5$ are simply bonds that link the agent to a polymer. For purposes of this specification, these polymeric chain transfer agents may be referred to as macrofers. In one example, where $R_3$ is attached a polymeric chain, the macrofers of the present invention can be defined by the formula (VI)

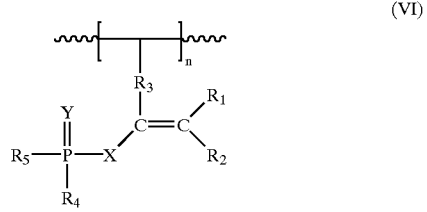

(VI)

where $R_1$, $R_2$, $R_4$, $R_5$, X and Y are defined as above for formula (II), n is one to about 5,000, $R_3$ is a bond, a divalent atom, or a divalent moiety as described for formula (III), hereinabove, and the polymer, represented by ~~~~, an include any polymeric structure. The polymeric structure can include any homopolymer, copolymer, terpolymer and the like, where the copolymers can be random, block or statistical copolymer arrangements. It should be understood that the macrofer defined by the formula VI can have between one and 5,000 units that contain $R_3$ and its complementary substituents. It should likewise be understood, however, that the entire polymeric structure is not exclusively comprised of these units. In fact, it is preferred that the macrofer include a larger number of other units, i.e., monomeric units, than the number of units containing $R_3$. Furthermore, it should be understood that the units containing $R_3$ can be dispersed along the polymeric structure in a random, block or statistical distribution. This will remain true for all macrofers defined within this specification.

In another example, $R_4$ is attached to a polymer chain and, therefore, the macrofers of the present invention can be defined by the formula (VII)

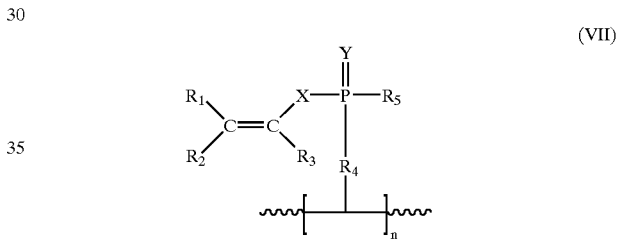

(VII)

where $R_1$, $R_2$, $R_3$, $R_5$, X, and Y are defined as above for formula (II), n is one to about 5,000, $R_4$ is a bond, a divalent atom, or a divalent moiety as described for formula (IV), hereinabove, and the polymer, ~~~~, can include any polymeric structure. The units containing $R_4$ can be dispersed along the polymeric structure in a random, block or statistical distribution.

In yet another example, where $R_2$ is attached to a polymer chain, the macrofers of the present invention can be defined by the formula (VIII)

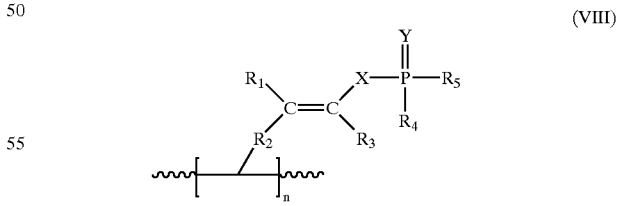

(VIII)

where $R_1$, $R_3$, $R_4$, $R_5$, X, and Y are defined as above for formula (II), n is one to about 5,000, $R_2$ is a bond, a divalent atom, or a divalent moiety as described for $R_3$ and $R_4$ in formulas (V) and (VI), hereinabove, and the polymer, ~~~~, can include any polymeric structure. The units containing $R_2$ can be dispersed along the polymeric structure in a random, block, or statistical distribution.

With further reference to the polymeric structure, ~~~~, in the foregoing formulas, it should be understood that the present invention should not be limited to any particular polymer chosen. As noted, the polymer can include any homopolymer, copolymer, and the like that is synthesized by any number of techniques known in the art including polymerization and polycondensation. Examples of the polymer chains that can contain groups active in chain transfer reactions include those polymers prepared from styrenes, acrylate esters, methacrylate esters, unsaturated nitrites, α, β-unsaturated acids, α, β-unsaturated ketones, vinyl halides, vinylidene halides, vinyl esters, vinyl ethers, anhydrides of unsaturated acids, etc. The transfer functionality can be at the chain ends and/or dispersed along the polymer chain backbone or copolymer. The polymer chains can also be part of a cross-linked network. Further, the polymers can be polycondensates, such as polyesters, polyamides, polyethers, polyurethanes, polycarbonates, polysulfones, phenolic resins, aminoplasts, epoxy resins, etc. The polymers can also include natural polymers such as natural rubber. There is no limitation to the structure of the polymer or to the number of transfer moieties it can contain, except that it must contain at least one chain transfer group per chain as exemplified in the foregoing formulas.

In another embodiment, the chain transfer agents of the present invention can actually be incorporated within the backbone of a polymeric structure. This is best exemplified and defined by the formula (IX)

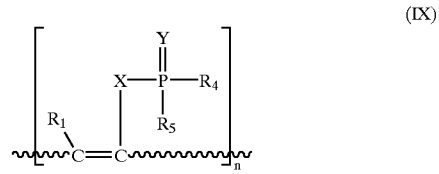

(IX)

where $R_1$, $R_4$, $R_5$, X, and Y are as defined above for formula (II), n is one to about 5,000, and the polymer, ∼∼∼, can include any polymeric structure. It should be understood that $R_2$ and $R_3$ as represented in formula (IX) are actually incorporated within the polymeric backbone. The unit containing the chain transfer functionality can be dispersed along the polymeric structure in a random, block or statistical distribution.

Specific examples of the macrofers defined by formulas (VI), (VII), (VII) and (IX) include, for example and without limitation, the following structures:

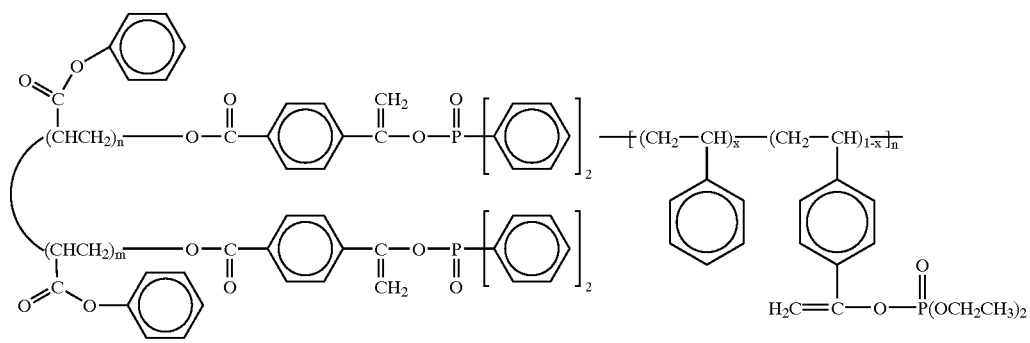

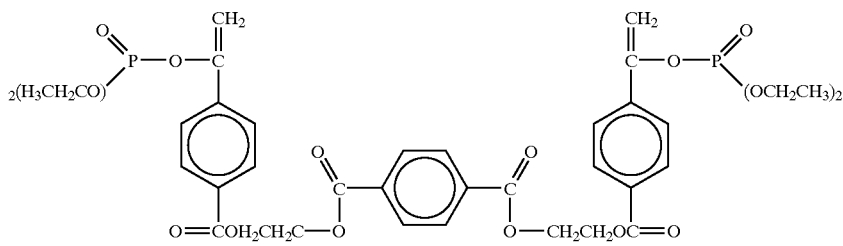

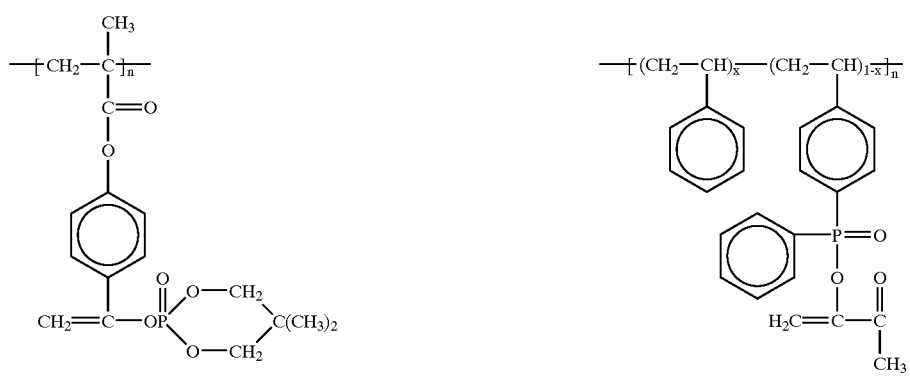

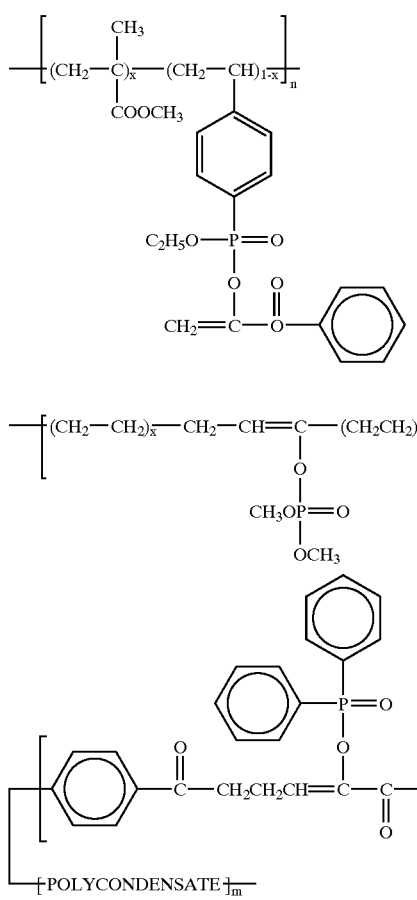
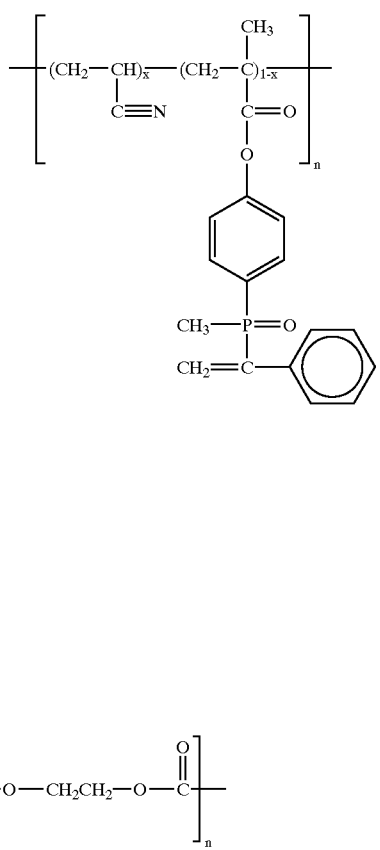

According to the foregoing polymeric formulas, it should be understood that the variable x represents a mole fraction of a copolymer, and the variables n and m represent an indefinite number of repeating units within a polymer.

The terms "organic group," "substituent group," or "moiety," as used in this specification, shall be understood to be any combination of atoms that is connected to structure I or II by a carbon-carbon, carbon-oxygen, carbon-nitrogen, carbon-sulfur, carbon-silicon or by a carbon-phosphorus bond in the case of $R_1$, $R_2$, and $R_3$ or by a phosphorus-carbon, phosphorus-oxygen, phosphorus-nitrogen, phosphorus-sulfur or phosphorus-silicon bond in the case of $R_4$ or $R_5$. The architecture of the organic group or substituent group may be such that it can be connected to the parent structure in several places. In other words, $R_4$ and $R_5$ may be connected by a multivalent atom such as carbon, oxygen, sulfur, nitrogen, etc. Similarly, $R_1$, $R_2$, or $R_3$ can be connected by such an atom.

Generally, organic groups $R_1$, $R_2$, and $R_3$ will be connected to the parent structure by carbon-carbon bonds but the other bonds mentioned above are possible. Because of their sensitivity to hydrolysis, however, compounds where $R_1$, $R_2$, and $R_3$ are connected by carbon-oxygen, carbon-nitrogen, or carbon-sulfur bonds to the parent structure may not be particularly valuable for the purpose of this invention.

The carbon, oxygen, nitrogen, sulfur or silicon atoms that are connected to either carbon (groups $R_1$, $R_2$, and $R_3$) or phosphorus (groups $R_4$ and $R_5$) atoms in the parent structure may in turn be bonded to carbon atoms of hydrocarbon groups or hydrocarbon groups that bear halogen atoms and/or other organic groups such as alcohol, ester, ketone, aldehyde, nitrile, ether, thioether, amino, sulfone, sulfoxide, sulfonate, thioester, dithioester, carbamate, dithiocarbamate, phosphine, phosphine oxide, phosphine sulfide, phosphonate, phosphinate, oxirane, isocyanate, isothiocyanate, carbodimide, phenolic, substituted phenolic, nitroxyl ether, substituted silicon, substituted polysiloxane, and anhydride, etc. groups. The foregoing groups themselves may be substituted with organic groups or comprise organic groups by substitution or otherwise. For example, a phenolic group may be substituted with an aliphatic olefinic, or aromatic group. Based upon the configuration of the group, the organic group therein may be disubstituted. The groups can be of unlimited size, including polymeric structures.

The carbon, oxygen, nitrogen, sulfur or silicon atoms that are connected to either carbon (groups $R_1$, $R_2$, and $R_3$) or phosphorus (groups $R_4$ and $R_5$) atoms in the parent structure may also be, in turn, attached to heterocyclic rings such as pyridyl, oxadiazole, thiazole, oxazole, furan, pyrrole, triazole, quinoxalene, thiophene, tetrahydrofuranyl, tetrahydrothiofuranyl, dioxolane, etc., rings, and analogs that are substituted with "organic groups" as defined above.

The term "hydrocarbon groups" referred to above means combinations of hydrogen and carbon atoms that may be referred to as alkyl, cycloalkyl, aryl, alkenyl, arylalkyl, cycloalkenyl, or alkynyl depending on whether carbon-carbon double bonds, carbon-carbon triple bonds and/or aromatic rings are present and upon whether the combinations contain carbon atoms connected in cyclic structures.

The skilled artisan will readily understand the meaning of the term organic group because the nomenclature of organic chemistry is covered in hundreds of textbooks. Typical hydrocarbon groups are methyl, ethyl, propyl, butyl, isopropyl, isobutyl, pentyl, octyl, cyclopentyl, cyclohexyl, vinyl, propenyl, hexenyl, ethenyl, phenyl, benzyl, phenethyl, naphthyl, biphenyl and polystyryl groups.

When one or more of the hydrogen atoms on a hydrocarbon group is replaced by another element or by a combination of several elements, then a substituted hydrocarbon group is obtained. Replacement of a hydrogen atom by an —O—H combination (itself called an alcohol group) generates a hydroxy-substituted hydrocarbon group. Typical examples are the hydroxyethyl, hydroxycyclohexyl, hydroxyphenyl and dihydroxycyclopentyl groups. Often, the presence of an alcohol group in a molecule causes organic chemists to prefer to name a compound as an alcohol rather than as a hydroxy-substituted molecule, but in this specification, this convention may not be followed.

In a similar manner, when one of the hydrogens of a hydrocarbon group is replaced by a halogen atom such as a chlorine or fluorine atom, a combination of two hydrogen atoms and a nitrogen atom that is termed an amino group, a combination of carbon and nitrogen atoms that is called a cyano group, or a silicon atom that is substituted with three alkyl groups, a substituted hydrocarbon group results.

Without being limited to any of the specific organic groups set forth herein, and to exemplify the breadth of organic groups that can be included within and define the various compounds of the present invention, the following organic groups are provided for illustration.

Examples of aliphatic groups include methyl, ethyl, propyl, isopropyl, n-butyl, t-butyl, isobutyl, pentyl, hexyl, heptyl, octyl, nonyl, dodecyl, cyclohexyl, and cyclopentyl groups. Examples of olefinic groups include vinyl, allyl, 2-hexenyl, 1-hexenyl, cyclohexenyl, and cyclopentenyl groups. Examples of arylalkyl groups include benzyl and phenethyl groups.

Examples of aromatic groups include phenyl, 1-naphthyl, 2-naphthyl, anthracyl, biphenyl, terphenyl, tolyl, diphenylmethyl, triphenylmethyl, xylyl, and tetrahydronaphthyl groups.

Examples of halocarbon groups include chloromethyl, dichloromethyl, trichloromethyl, bromomethyl, chloroethyl, and trifluoromethyl groups. Examples of alcohol groups include hydroxyethyl, hydroxypropyl, hydroxyphenyl, dihydroxycyclopentyl, hydroxycyclohexyl, 3-hydroxypropyl, 4-hydroxybutyl, hydroxyethylphenyl, 2-chloro-4-hydroxyphenyl and p-hydroxybenzyl groups.

Examples of amino groups include methylamino, dimethylamino, phenylmethylamino, benzylamino, dibenzylamino, 1,5-pentamethyleneamino, morpholino, diethylamino, methylethylamino, and propylamino groups.

Examples of ester groups include acetoxy, benzoyloxy, acetoxyethyl, benzoyloxyphenyl, and trichloroacetoxypropyl groups. Examples of ketone groups include acetyl, benzoyl, p-chlorobenzoylphenyl, napthoylethyl, and cyclohexanoyl groups.

Examples of ether and thioether groups include methoxy, ethoxy, phenoxy, trimethylsilanylphenoxy, methoxyethyl, methoxyphenyl, methoxyethoxyethyl, methylthio, and phenylthio groups. Examples of aldehyde groups include formyl, 1-formylethyl, 4-formylphenyl, 4-formylbenzyl, 4-formylbenzyloxy, and 4-formylphenoxy groups.

Examples of nitrile groups include cyano, cyanoethyl, cyanophenyl and cyanophenyloxyphenyl groups. Examples of sulfur and sulfoxide groups include phenylsulfenyl, methylsulfonyl, and phenylsulfonylmethyl groups.

Examples of thioester and dithioester groups include methoxythiocarbonylmethyl and p-phenylthiothiocarbonylphenyl.

Polymers refer to molecules that are high in molecular weight, and are typically synthesized by the polymerization or polycondensation of monomers. Polymers include both natural and synthetic polymers, as well as homopolymers and copolymers. The copolymers can be random, statistical, or block copolymers. Useful polymers can include those derived from monomers such as ethylene, isobutylene, acrylonitrile, vinyl chloride, butadiene, styrene, methyl methacrylate, vinyl acetate, vinylidene chloride, vinylidene fluoride, tetrafluoroethylene, and isoprene. The skilled artisan will readily recognize that the foregoing list of monomers is merely exemplary, and that a host of other monomers can, and have been, employed to prepare polymers. Non-limiting examples of polymers include vinyl polymers and copolymers, polyamides, polyesters, polyurethanes, polysiloxanes, and polyacetals. Numerous polymers and copolymers, as well as synthetic procedures for preparing the same, are disclosed in *Principles of Polymerization*, Third Edition, by George Odian (1991). Non-limiting examples of polymers include polybutadiene, polyethylene, polypropylene, poly(ethylene-co-propylene), polystyrene, poly(ethyl acrylate), poly(methyl methacrylate), poly(vinyl pyridine), poly(vinyl acetate), poly(vinyl chloride), poly (vinyl acetate-co-vinyl chloride), poly(styrene-co-acrylonitrile), polytetrahydrofuran, poly(ethylene oxide), starch, dextran, Guar gum, ethylcellulose, cellulose acetate, poly(vinyl pyrrolidone), nylon-6, penton, bisphenol A polycarbonate, polysulfone, poly(dimethyl siloxane) poly (styrene-block-polybutadiene), poly(n-vinylpyrrolidene), crosslinked poly(styrene-co-divinylbenzene).

The chain transfer agents of the present invention are preferably prepared by the Perkow reaction, which is generally shown below.

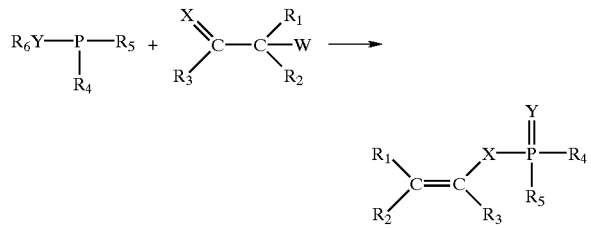

where $R_1$, $R_2$, $R_3$, $R_4$, $R_5$, X and Y are defined as above for formula (II), $R_6$ is an aliphatic group, preferably ethyl, methyl, or benzyl, and W can be a halogen such as chlorine, bromine or iodine, or an alkyl or aryl sulfonate group, or any group that is recognized as a good leaving group. Preferably, W is a halogen. As shown, the Perkow reaction generally involves the reaction of an ester of a trivalent phosphorus acid (phosphite, phosphonite and phosphinite, thiophosphite, thiophosphonite, thiophosphinite, etc.) with an α-halogen substituted aldehyde, ketone, or ester. This reaction is generally described in F. W. Lichtenthaler, Chemical Reviews, 61, 607 (1961), G. B. Borowitz and I. J. Borowitz, *Handbook of Organophosphorus Chemistry*, edited by R. Engel, M. Dekker, New York, N.Y., 1992, pp. 115–172, which are expressly incorporated herein by reference.

Although trivalent phosphorus esters (phosphites, phosphonites, and phosphinites, etc.) are often used in the Perkow reaction, it is also possible to use the pentavalent phosphorus compounds that would be obtained by hydrolysis of the trivalent phosphorus esters or that could be prepared by other well known methods. These pentavalent phosphorus compounds will generally have the following structure:

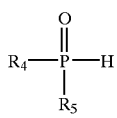

where $R_4$ and $R_5$ are defined above.

For example, hydrolysis of trimethyl phosphite yields dimethyl phosphite as shown below.

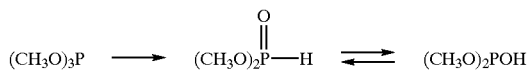

This material will react with a haloalkyl carbonyl compound, such as an α-chlorocarbonyl compound to yield the same product that is obtained when trimethyl phosphonate reacts. This equivalency is shown below.

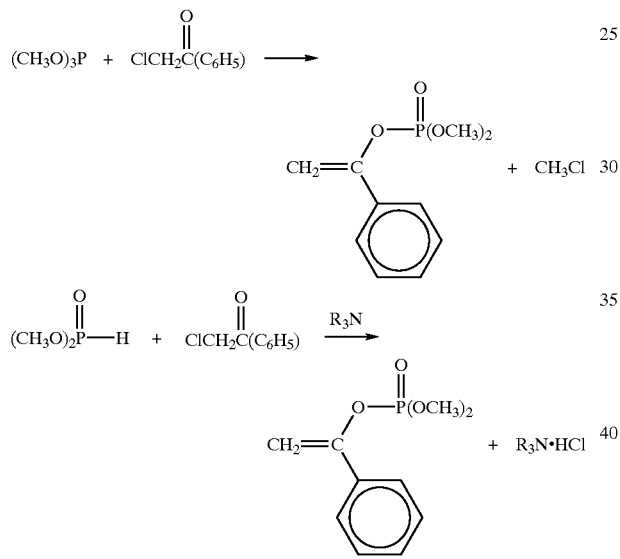

In a similar manner, other compounds with the pentavalent phosphorus functionality, such as diphenylphosphine oxide, can be used in the Perkow reaction to prepare the addition/fragmentation agents of this invention. Accordingly, chain transfer agents prepared using this alternative reaction are considered to be part of the invention herein described.

Figure 3:
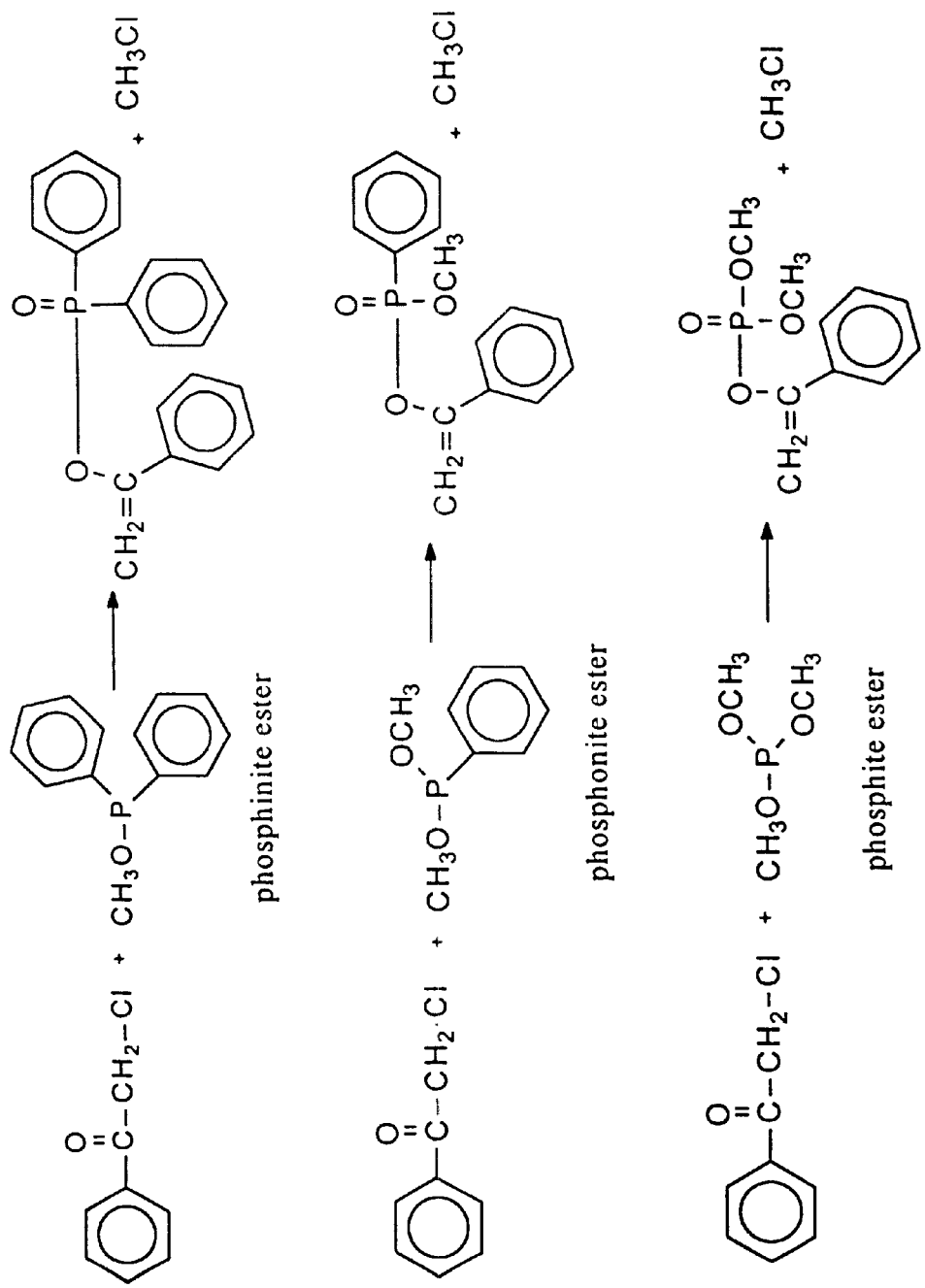
FIG. 3 depicts the preparation of chain transfer agents of this invention by reacting esters of trivalent phosphorous acids with α-haloketones or α-haloesters.

According to the Perkow reaction, and as depicted in FIG. 3, the chain transfer agents of the present invention can be prepared by reacting esters of trivalent phosphorus acids, e.g., phosphinites, $[(R)_2POR']$, phosphonites $[RP(OR')_2]$, or phosphites $[(RO)_3P]$ with α-haloketones or α-haloesters. It should be appreciated that the phosphinite ester is more reactive than the phosphonite ester, and that the phosphonite ester is more reactive than the phosphite ester. It should also be appreciated that in preparing some of the compounds of the present invention, the foregoing phosphorus esters may include the thio- or amino- analogs of those esters including, without limitation, thiophosphinite esters, thiophosphonite esters, thiophosphite esters, aminophosphinite esters, aminophosphonite esters, and aminophosphite esters. These compounds may collectively be referred to as trivalent phosphorus reactants.

Non-limiting examples of α-haloketones or α-haloesters include α-chloroacetophenone, α,α-dichloroacetophenone, ethyl chloroacetate, α-chloroacetaldehyde, α-bromopropionaldehyde, α-chloropropriophenone, methyl p-chloroacetylbenzoate, and p-chloroacetylphenol. These compounds may be collectively referred to herein as haloalkyl carbonyl compounds.

The preferred reactions are conducted at temperatures that range from about −50° C. to about +120° C., depending on the reactivities of the trivalent phosphorus reactants and the haloalkyl carbonyl compounds. They are best conducted by adding the trivalent phosphorus reactants to an excess of the haloalkyl carbonyl compound to minimize occurrence of the competing Arbuzov reaction, which isomerizes the trivalent phosphorus ester to a pentavalent, unreactive compound. The vinyl compounds that result from the Perkow reaction can be purified by the usual techniques of skilled artisans including distillation, recrystallization and chromatography.

One particular advantage of use in the Perkow reaction is that the compounds of the present invention are easily prepared in a 1-step reaction from easily synthesized or readily available intermediates. Because of the simplicity and versatility of the Perkow reaction, a wide variety of new addition-fragmentation reagents can be synthesized and used for the control of polymer molecular weight, for the synthesis of telechelic (end-functional) polymers, block copolymers, graft copolymers, star polymers and polymers with other controlled architectures.

Where a macrofer is prepared, the Perkow reaction is also useful, and in fact preferred. In general, macrofers can be prepared by reacting a trivalent phosphorus reactant, as described above, with a polymer containing a haloalkyl carbonyl group. A polymer containing a haloalkyl carbonyl group can include a monomer unit such as a chloroacetyl-styrene unit. A polymer with a haloalkyl carbonyl group can be represented by the following formula where w is a halogen such as chlorine, $R_1$ and $R_2$ are groups as defined above such as hydrogen atoms, and $R_3$ is a group as defined as above:

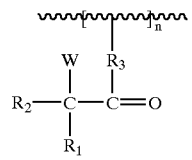

It should also be appreciated that the polymer can be a polymeric group for several haloalkyl carbonyl groups and thereby, upon reacting with a trivalent phosphorus reactant (or pentavalent equivalent), form a compound such as the following:

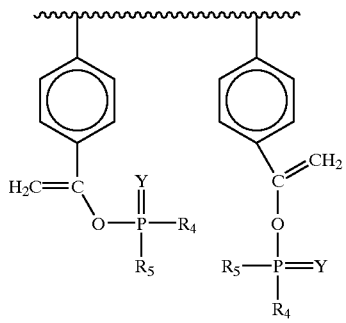

where $R_3$ is a divalent group, such as a phenylene group as set forth above, and the substituents $R_1$, $R_2$, $R_4$, $R_5$, and X are as discussed above.

Because chloroacetyl groups can be easily introduced onto aromatic rings by the Friedel Crafts reaction, and because aromatic compounds that are substituted with chloroacetyl groups readily react with trivalent phosphorus compounds to form addition-fragmentation agents, this chemistry can preferably be employed to prepare a large variety of substituted polymers and substituted aromatic and polyaromatic compounds that can be used as chain transfer agents. These materials can be used for the preparation of block and graft polymers, highly branched polymers, polymers with star or radial block architectures, and polydendrimers.

Figure 4:
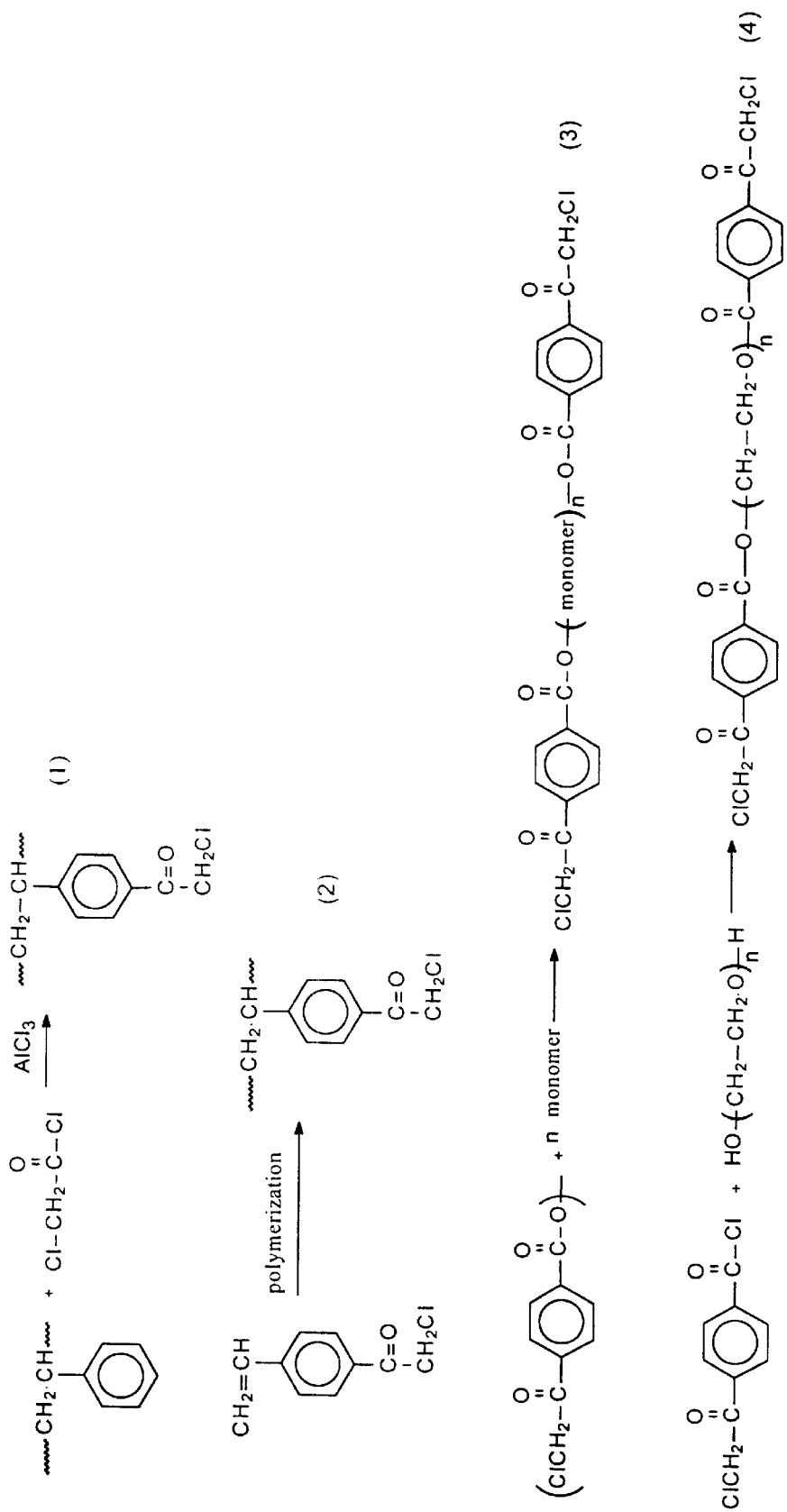
FIG. 4 depicts tour exemplary reactions to form a chloroacetylphenyl group extending from a polymeric chain, for the purpose of producing a macrofer.

In one embodiment, where a macrofer is prepared, the phosphorus reactant is reacted with a chloroacetylphenyl group that extends from a polymeric chain. With reference to FIG. 4, there are depicted four exemplary reactions that can be employed to form the chloroacetylphenyl group within a polymer. The first reaction involves chemically modifying polymers containing styrene units with chloroacetyl chloride using the Friedel Crafts reaction, designated reaction (1). The second reaction involves polymerization and copolymerization reactions that involve chloroacetylstyrenes, designated reaction (2). The third reaction involves polymerization reactions initiated by free radical initiators that contain chloroacetylphenyl groups, designated reaction (3). The fourth reaction involves polymerization reactions that involve intermediates containing chloroacetylphenyl groups, designated reaction (4). Reaction of these materials with trivalent phosphorus esters according to the Perkow reaction can then yield polymers with chain ends or pendent groups that are vinyl esters of phosphorus acids. These materials can then behave as macrofers for the synthesis of block and graft polymers.

Figure 5:
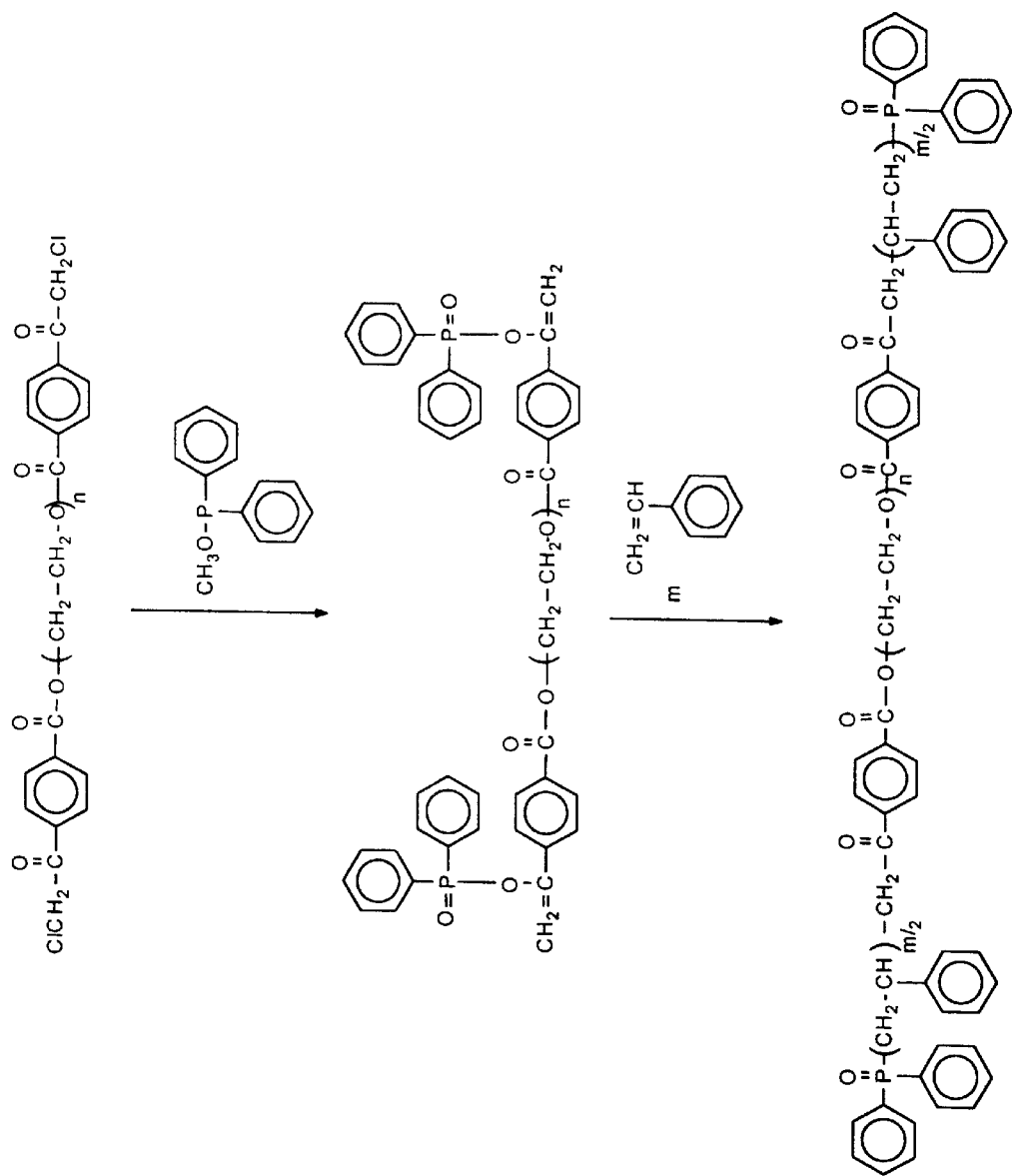
FIG. 5 depicts the preparation of a macrofer by the reaction of methyl diphenylphosplinite with the product of reaction (4) in FIG. 4.

An example of a block copolymer synthesis is the reaction of the polymer resulting from reaction (4), depicted in FIG. 4, with methyl diphenylphosphinite. This reaction can yield the macrofer shown in FIG. 5, which when present during a styrene polymerization would yield a triblock copolymer containing polystyrene and poly(ethylene oxide) segments.

Figure 6:
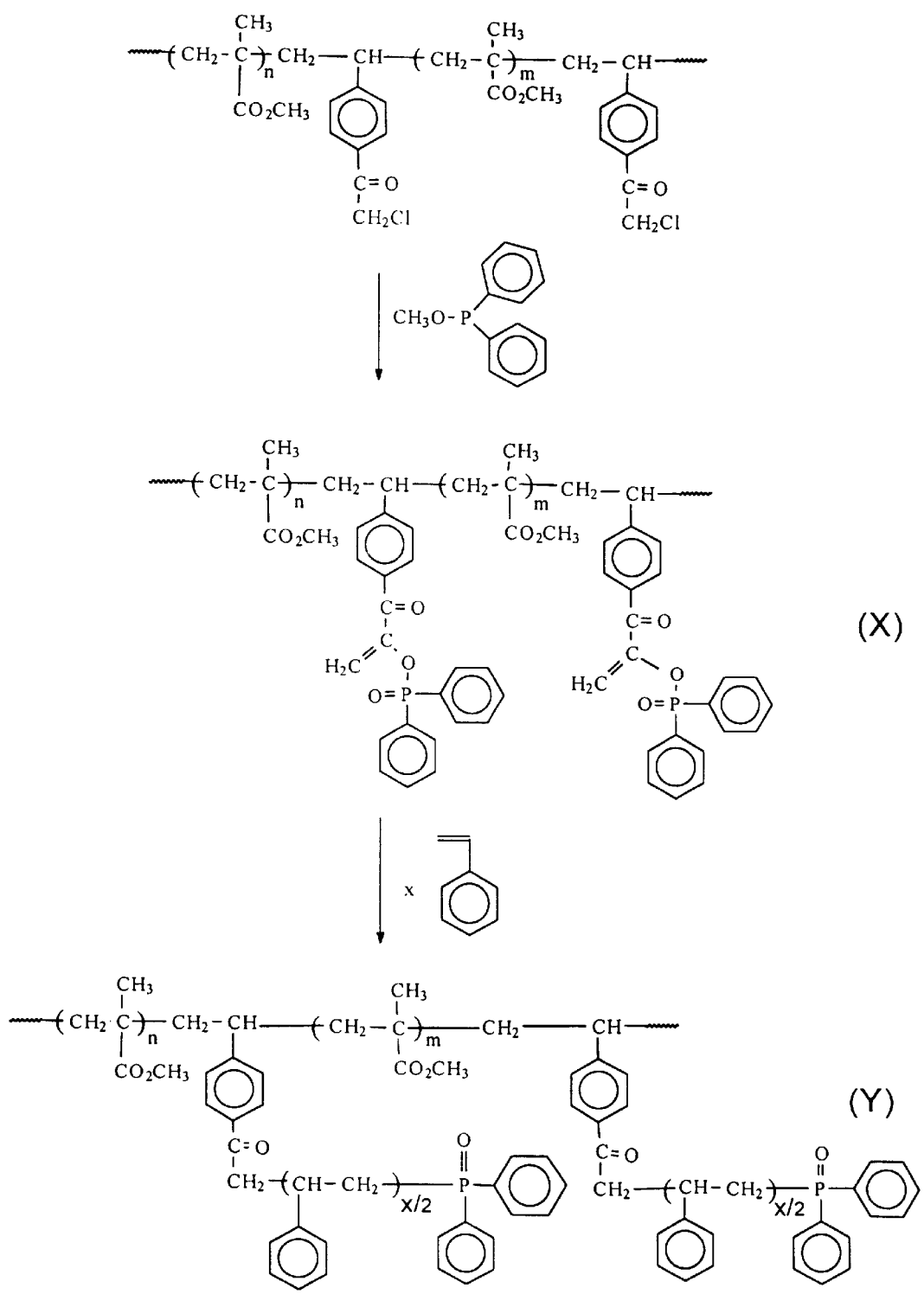
FIG. 6 depicts the preparation of a macrofer by the reaction of a copolymer of methyl metacrylate and chloroacelylstyrene with methy diphenylphosplinite.

An example of a graft copolymer synthesis is the reaction of a copolymer of methyl methacrylate and chloroacetylstyrene, which can be prepared according to reaction (2) within FIG. 4, with methyl diphenylphosphinite according to the Perkow reaction. This reaction should yield the macrofer (X) shown in FIG. 6, which when present in a styrene polymerization reaction would cause the formation of a graft copolymer (Y) with a poly(methyl methacrylate) main chain and polystyrene branches (grafts).

In addition to preparing macrofers by submitting polymers to the Perkow reaction, it is also possible to prepare them directly by polymerizing and copolymerizing monomers that have vinyl esters of phosphorus acids as substituents. Two examples of these monomers include methyl 1-styryl 4-styrylphosphonate, and 1-(4-vinylstyryl) diphenylphosphinate, respectively:

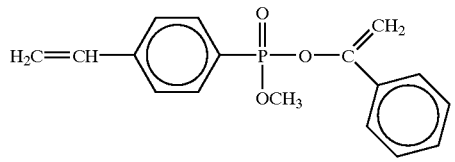

-continued

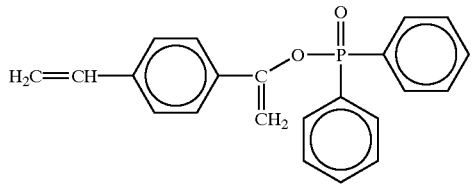

Polymerizations involving such monomers can yield highly branched polymers because addition-fragmentation reactions can occur at the same time that normal vinyl polymerization occurs. Highly branched polymers, and copolymers derived therefor, can be prepared with or without polymerizable groups.

As noted, the compounds of the present invention are useful as chain transfer agents, which are particularly useful in free radical polymerization. Monomers or monomer combinations that are susceptible to free-radical polymerization include those with the general structure:

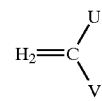

where U and V are hydrogen or organic groups as defined above. Optionally, the monomers are selected from the group that consists of maleic anhydride, N-alkylmaleimide, N-arylmaleimide, dialkyl fumarate and cyclopolymerizable monomers. Monomers defined by the above formula include acrylate and methacrylate esters, acrylic and methacrylic acid, styrene, acrylamide, methacrylamide, and methacrylonitrile, mixtures of these monomers, and mixtures of these monomers with other monomers. As one skilled in the art would recognize, the choice of comonomers is determined by their steric and electronic properties. The factors that determine copolymerizability of various monomers are well documented in the art. A more detailed discussion of the foregoing can be found in chapters 3 and 6 of *Principals of Polymerization*, Third Edition by George Odian, John Wiley & Sons, Inc., (1991). The entire content of these chapters is incorporated herein by reference.

Specific monomers or comonomers include the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutylmethacrylate (all isomers), N,N-di methylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, triethyleneglycol acrylate, methacrylamide, N-methylacrylamide, N,N-dimethylacrylamide, tert-butylethacrylamide, n-butylmethacrylamide, N-methylolmethacrylamide, N-ethylolmethacrylamide, tert-butylacrylamide, n-butylacrylamide, N-methylolacrylamide, N-ethylolacrylamide, vinyl benzoic acid (all isomers), diethylaminostyrene (all isomers), alpha-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, trimethoxysilylpropyl methacrylate, tributoxysilylpropyl methacrylate, dimethoxymethylsilyipropyl methacrylate, diethoxymethylsilypropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, trimethoxysilylpropyl acrylate, tributoxysilyipropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylamaleimide, N-butylmaleimide, N-vinylpyrrolidone, N-vinylcarbazole, butadiene, isoprene, chloroprene, ethylene, propylene.

The polymerization reactions in which the chain transfer agents of the present invention are employed can be initiated by any of the conventional ways used to initiate free radical polymerization. These initiation techniques include, without limitation, thermal decomposition of peroxides and azo compounds, redox initiation, photochemical and radiochemical initiation, etc. For a further discussion of free radical polymerization, one can refer to Chapters 3 and 6 of *Principles of Polymerization*, Third Edition by George Odian, which chapters are incorporated herein by reference.

The methods used to conduct the polymerizations can be any of the methods used to conduct a free radical polymerization including polymerization of bulk monomer/transfer agent mixtures, solution polymerization, suspension polymerization, precipitation polymerization, conventional emulsion polymerization, inverse emulsion polymerization, polymerizations employing supercritical liquids as solvents, etc. According to these methods, the chain transfer agents of the present invention can be initially mixed or blended with the monomers, with the step of initiation occurring subsequent to this mixing or blending. Alternatively, the addition of the chain transfer agent can be scheduled throughout the polymerization process.

Figure 7:
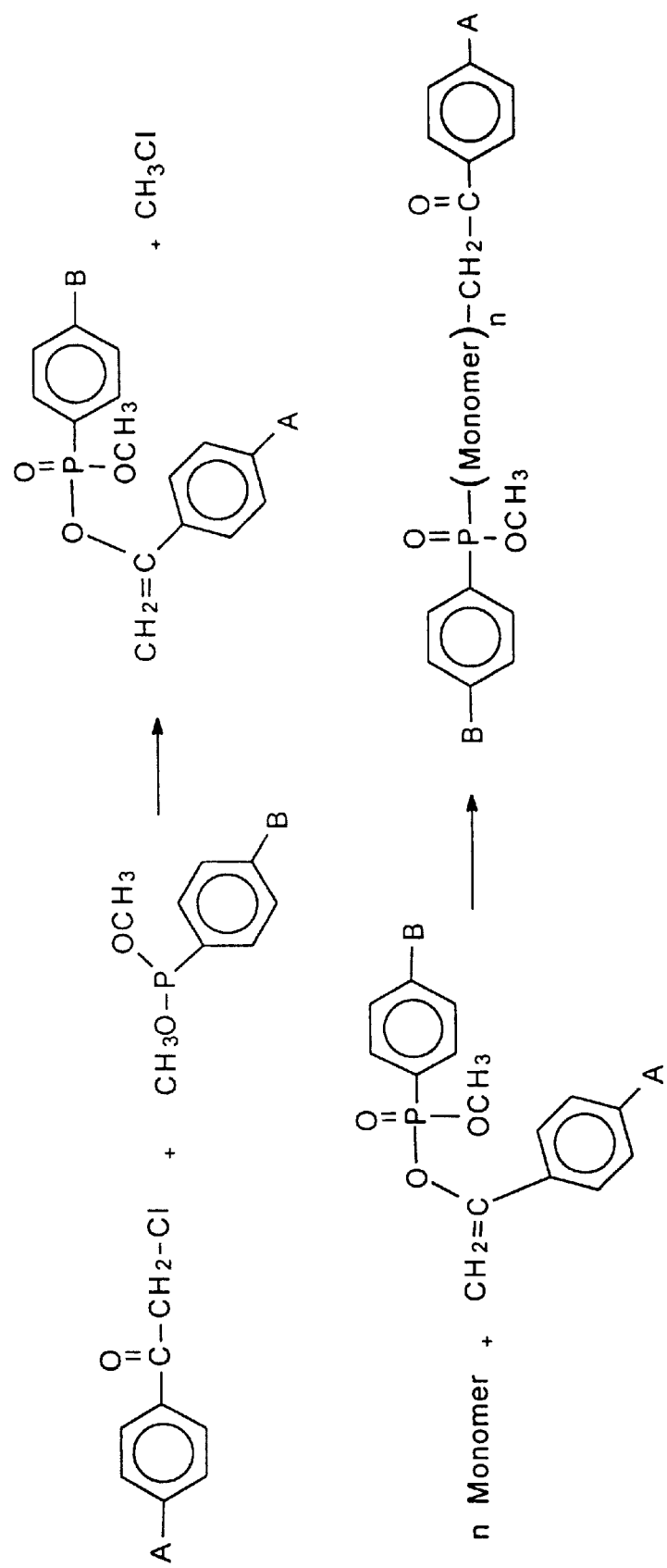
FIG. 7 depicts the synthesis of chain transfer agents and their use in preparing polymers, wherein the chain transfer agents and the resulting polymers may have various functional groups.

The chain transfer agents of the present invention can be used to make novel materials with useful functional groups at their chain ends. For example, FIG. 7 shows the synthesis of chain transfer agents that contain A and B functional groups, and their use in preparing polymers having A and B functional groups at their ends. A and B can be, for example, ester groups, protected hydroxyl groups, protected carboxylic acid groups, epoxy groups, vinyl groups, protected amino groups, isocyanate groups, and organosilicon groups. As noted above, the skilled artisan may select a number of functional groups for A and B depending upon the desired application.

The present invention can also be adapted to confer chain transfer capability to polymers, thereby making them useful polymers that are useful as chain transfer agents. Appropriately modified polymers can be used as macrofers for the synthesis of block and graft copolymers.

Figure 8:
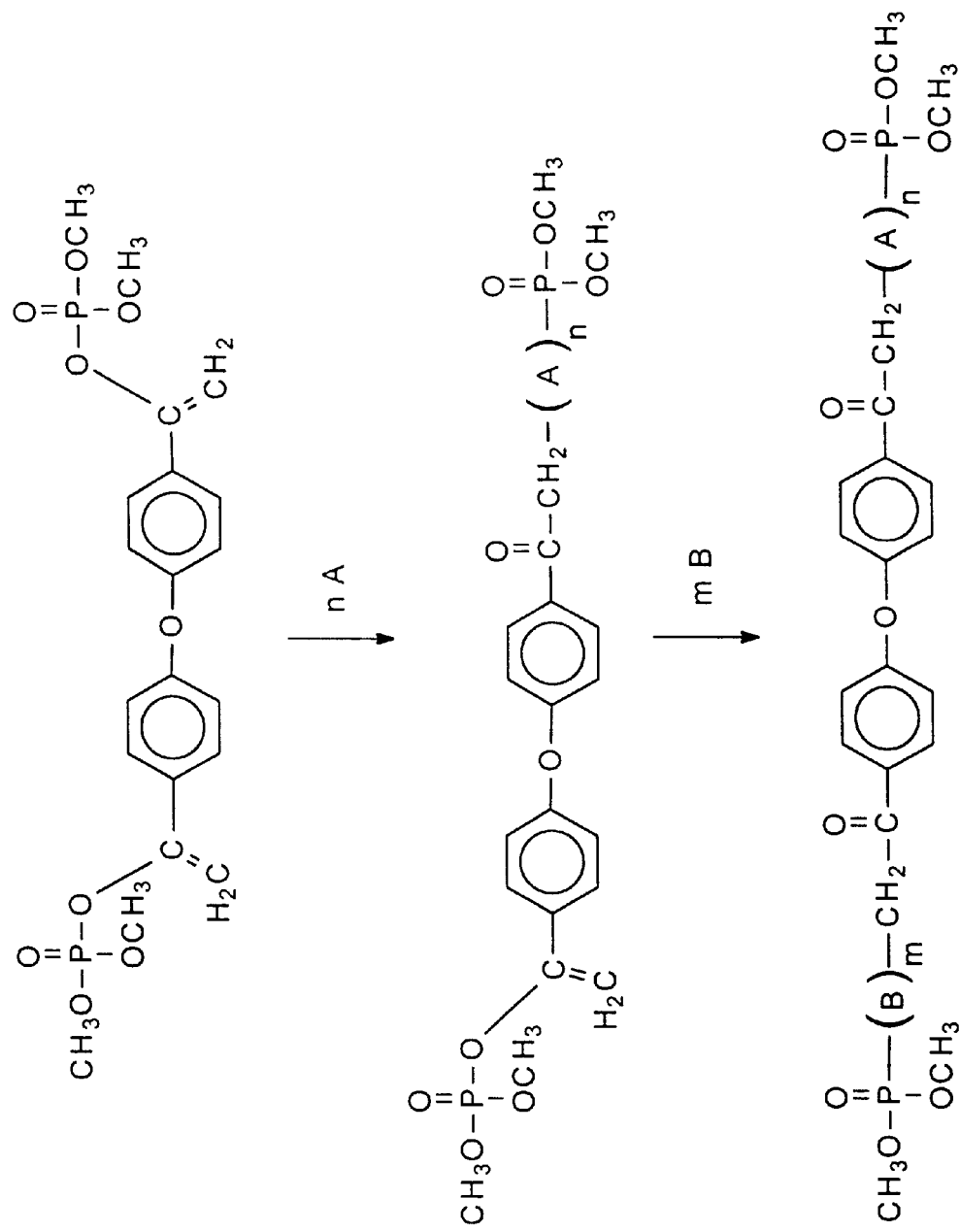
FIG. 8 depicts difunctional addition-fragmentation agents used for the synthesis of block copolymers.

Difunctional addition-fragmentation agents can be used for the synthesis of block copolymers. For instance, a polymer prepared in the presence of a difunctional addition-fragmentation agent may contain an unreacted vinyl phosphorus ester group at one of its ends, as is shown by the first reaction (involving monomer A) in FIG. 8. If this polymer (a macrofer) is present when a second monomer (B) is polymerized, a block copolymer will form. This is illustrated in FIG. 8 for the process that starts with an addition-fragmentation agent that contains two vinyl phosphonate groups.

Figure 9:
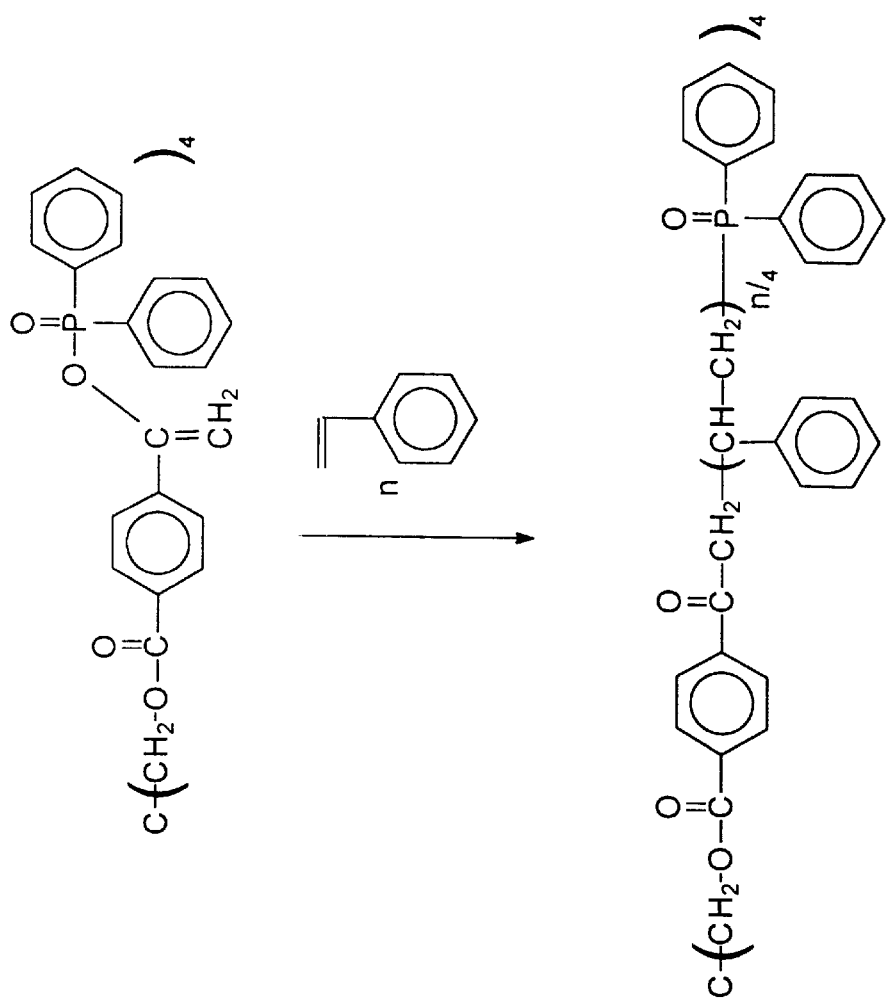
FIG. 9 depicts multi-functional addition-fragmentation agents used for the synthesis of polymers having star architectures.

Multi-functional addition-fragmentation agents can also be used for the synthesis of polymers with star architectures. For example, and with reference to FIG. 9, an addition-fragmentation agent that contains four vinyl phosphinate groups can be used to prepare a polystyrene with four polystyrene arms.

Figure 10:
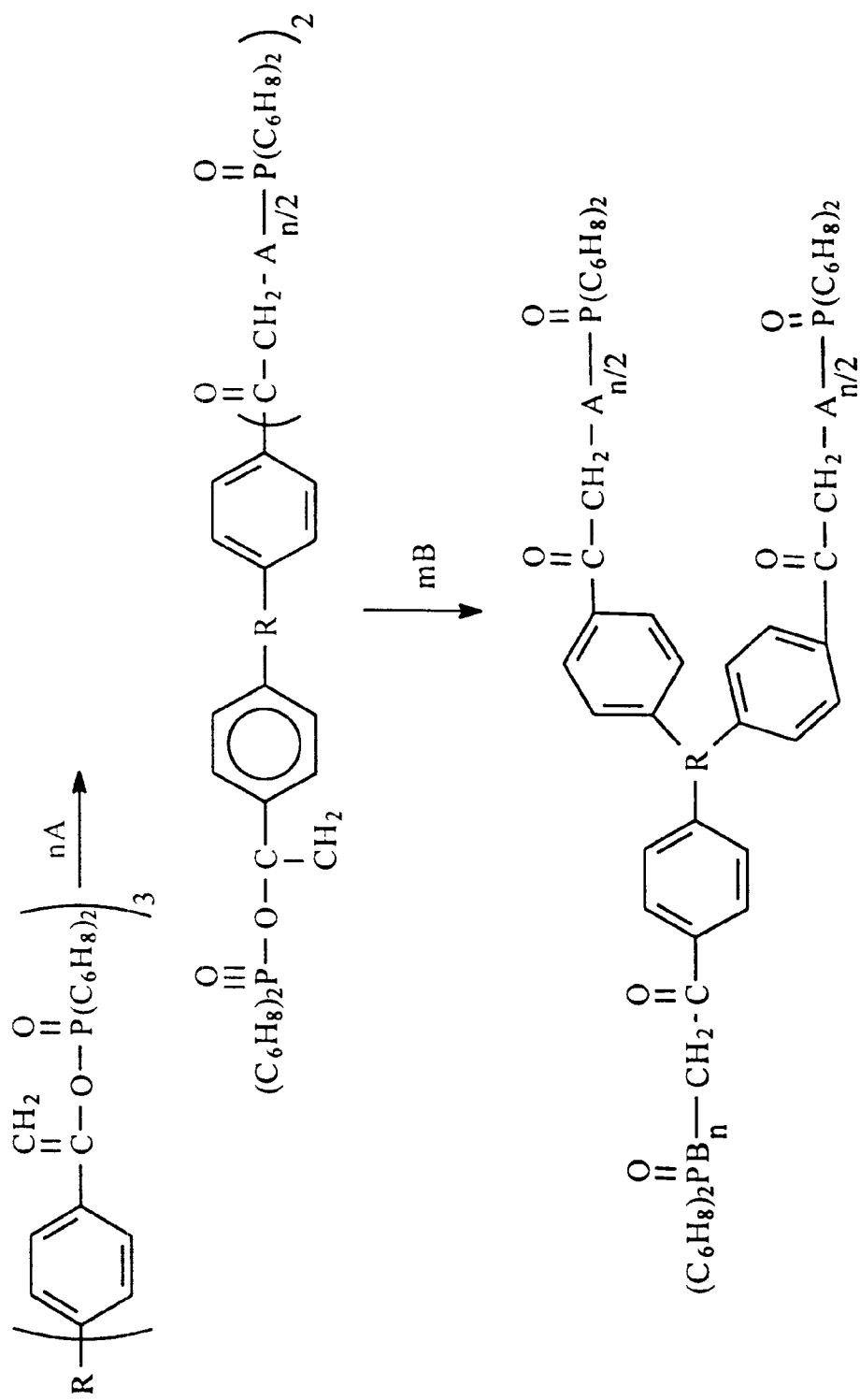
FIG. 10 depicts the preparation of a branched macrofer that can he used for preparation of star polymer architectures.

By conducting a polymerization in the presence of the above reagent under conditions such that only a portion of the vinyl phosphorus esters participates in addition-fragmentation, a branched macrofer is obtained that can be used for the subsequent preparation of star polymer architectures containing several different polymer arms. This is illustrated in FIG. 10.

A further benefit of the present invention is that the radicals that result from the fragmentation reactions are substituted phosphinyl radicals that have reactivities for monomers that are several orders of magnitude greater than that of carbon-centered radicals and of other radicals that are derived from presently known addition-fragmentation agents. Therefore, the step that generates new polymer chains after fragmentation occurs is much more efficient than the reinitiation step that occurs after many conventional chain transfer processes.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

EXAMPLE 1

Synthesis of 1-Phenylvinyl Diphenylphosphinate

Methyl diphenylphosphinite (67.5 g, 0.312 mol) was added to hexane (200 mL) in a 500 ml round bottom flask under inert atmosphere (constant flow of dry argon). The solution was then cooled to −78° C. by immersion of the reaction vessel into a dry ice/acetone bath. The methyl diphenylphosphinite was observed to freeze out of solution. To the reaction vessel at reduced temperature, chloroacetophenone (48.3 g, 0.313 mol) in chloroform (140 ml) was added. The reaction vessel was allowed to warm to room temperature over three hours with constant stirring and argon flow. As the methyl diphenylphosphinite melted into the solution, a white precipitate formed. After completion of the three hour reaction time, the crude product was obtained by removal of hexane and chloroform. H-NMR analysis of the crude product showed 86.7% of the desired Perkow product, 13.3% Arbusov byproduct, and no methyl diphenylphosphinite starting material. The skilled artisan will appreciate that the Arbusov byproduct is methyldiphenylphosphine oxide.

Recrystallization from hot hexane followed by drying for 12 hours in a vacuum oven at 60° C./6 mm Hg yielded 1-phenylvinyl diphenylphosphinate (84.3 g, 84.3% overall yield). The melting point of the recrystallized product was determined to be from about 88.8 to about 89.4° C. The proton NMR spectrum displayed characteristic resonances at 5.1–5.25 ppm and 7.1–8.1 ppm for the two vinylic and 15 collective aromatic protons, respectively. The mass spectrum obtained showed peaks at m/z=321, 219 and 201. The peaks corresponded to the molecular weight of the compound (M)g m-$C_8H_8$ and M-$C_{12}H_{10}PO$, respectively. Furthermore, the IR spectrum displayed absorbencies at 1625 am$^{-1}$, 1226 am$^{-1}$, and 986 am$^{-1}$, which corresponded to vinyl C=C bond stretching, P=O bond stretching, and P(=O)—C bond stretching frequencies, respectively.

EXAMPLE 2

Synthesis of 1-Methylvinyl Diphenylphosphinate

Methyl diphenylphosphinite (4.92 g, 22.7 mmol) was dissolved in chloroform (2 ml) in a 15 ml round bottom flask under inert atmosphere (constant flow of dry argon). The solution was then cooled to −78° C. by immersion of the reaction vessel into a dry ice/acetone bath. The methyl diphenylphosphinite was observed to freeze out of solution. To the reaction vessel at reduced temperature, a solution of chloroacetone (1.8 ml, 22.5 mmol) in chloroform (1 ml) was added. The reaction vessel was allowed to warm to room temperature over three hours with constant stirring and argon flow. As the methyl diphenylphosphinite melted into the solution, the reaction proceeded. After the completion of the three hour reaction time, the crude product was obtained by removal of the chloroform. Recrystallization from hot hexane followed by drying for 12 hours in a vacuum oven (60° C. 6 mm Hg) yielded 1-methylvinyl diphenylphosphinate (4.62 g, 79.6% overall). The melting point of the recrystallized product was determined to be from about 84.1 to 85.3° C. The proton NMR of the product in CDCl$_3$ showed the expected resonances (relative to TMS at 0.0 ppm) at 1.01 ppm correlating to the three methyl protons, at 4.29 ppm and 4.64 ppm for the two vinyl protons, and at 7.3–7.8 ppm for the ten aromatic protons. The phosphorus NMR of the product in CDCl$_3$ showed a simple resonance relative to 85% H$_3$PO$_4$ at 20.00 ppm.

EXAMPLE 3

Synthesis of 1-Phenylvinyl Methyl Phenylphosphonate (1-PVMPP)

Under a constant flow of dry nitrogen, 2-chloroacetophenone (17.3 g, 112 mmol) was melted in a 100 ml round bottom flask using a 65° C. oil bath. The flask was equipped with a magnetic stir bar and an addition funnel with a pressure-equalizing sidearm. Dimethyl phenylphosphonite (23.0 g, 135 mmol) was then added dropwise (21.5 ml via addition funnel) to the melted chloroacetophenone over the course of 1.25 hour. The evolution of a gas, presumably methyl chloride, was observed throughout the course of the addition and was perceived as evidence for formation of product.

After the 1.25 hour, 26.7 g (97 mmol, 86.4%) of the pale yellow liquid product 1-PVMPP was obtained by vacuum distillation (175° C. 2 mm Hg). The proton NMR spectrum of the product in CDCl$_3$ shows the expected resonances (relative to TMS at 0.0 ppm) at 3.4–3.8 ppm correlating to the 3 methoxy protons, 4.8–5.1 ppm for the 2 vinyl protons, and at 6.8–7.9 ppm for the collective ten aromatic protons. The mass spectrum displayed a peak at m/z=275.08, which corresponded to the molecular weight of the product. Other peaks were observed at m/z=173.06 and 105.05, which correspond to loss of styrene and protonated styrene, respectively.

EXAMPLE 4

Synthesis of 1-Phenylvinyl Dimethylphosphate (1-PVDMP)

Under a constant flow of dry nitrogen, 2-chloroacetophenone (21.5 g, 1 39 mmol) was melted in a 100 ml round bottom flask using an 85° C. oil bath. The flask was equipped with a magnetic stir bar and an addition funnel with a pressure-equalizing sidearm. Trimethyl phosphite (17.9 g, 140 mmol) was then added dropwise (17.0 ml via addition funnel) to the melted chloroacetophenone over the course of 1.5 hours. The evolution of a gas, presumably methyl chloride, was observed throughout the course of the addition and was perceived as evidence for formation of product.

After the 1.5 hours, 24.7 g (108 mmol, 77.4%) of the pale yellow liquid product 1-PVDMP was obtained by vacuum distillation (130° C. 2 mm Hg). The proton NMR spectrum of the product in CDCl$_3$ showed the expected resonances (relative to TMS at 0.0 ppm) at 3.6–4.1 ppm correlating to the 6 methoxy protons, 5.1–5.5 ppm for the 2 vinyl protons, and 7.2–7.8 ppm for the 5 aromatic protons. The mass spectrum displayed a peak at m/z=229.04, which corresponded to the molecular weight of the product. A peak was also displayed at m/z=127.04, which corresponded to the loss of styrene.

EXAMPLE 5

Synthesis of 1-Phenylvinyl-2,2-Dimethylpropylphosphate (1-PVNPGP)

Under a constant flow of dry nitrogen, 2-chloroacetophenone (9.86 g, 63.8 mmol) was melted in a 100 ml round bottom flask using a 85° C. oil bath. The flask was equipped with a magnetic stir bar and an addition funnel with a pressure-equalizing sidearm. 2,2-Dimethylpropylene methyl phosphite (10.51 g, 64.0 mmol) was then added dropwise (via addition funnel) to the melted chloroacetophenone over the course of 1.25 hours. The evolution of a gas, presumably methyl chloride, was observed throughout the course of the addition and was perceived as evidence for formation of product. After the addition was complete, the reaction mixture was stirred an additional 2 hours.

The resulting viscous yellow liquid. solidified upon standing at room temperature. After recrystallization from warm hexane, followed by drying in a vacuum oven at room temperature and 1 mmHg, 12.57 g of 1-PVNPGP (46.9 mmol, 73.4%) was obtained as a white solid. The melting point of the purified product was determined to be 55.3–56.5° C. The proton NMR spectrum of the product in CDCl$_3$ showed the expected resonances (relative to TMS at 0.0 ppm) at 0.87 and 1.31 ppm correlating to the total of 6 methyl protons and 3.80–4.3 ppm for the 4 methylene protons, in the cyclic moiety. Further resonances were observed at 5.1–5.5 and 7.1–7.7 ppm, which corresponded to the 2 vinyl and 5 aromatic protons, respectively.

EXAMPLE 6

Chain Transfer Studies

Photoinitiated chain transfer experiments were conducted for methyl methacrylate and styrene polymerizations using 1-phenylvinyl diphenylphosphinate and 1-methylvinyl diphenylphosphinate as chain transfer agents. These photoinitiated solution polymerizations were carried out in clear 6 ml borosilicate glass bottles with aluminum crimp top seals containing a Teflon-coated rubber septum. The initiator (Lucirin TPO), monomer, and transfer agent were weighed into a 5 ml volumetric flask. The flask was then filled to the line with benzene. The benzene solution was then transferred into the glass vial, capped, and sparged with argon for 10 minutes. The polymerization vessel was then placed in front of a 300 watt tungsten lamp at a distance of 30 cm. The polymerization solution was then irradiated with continual stirring for 45 minutes. The samples were then precipitated into methanol, reprecipitated from benzene solution into methanol, and then precipitated into hexane. The solid polymers were then collected by filtration, dried in a vacuum oven at 60° C. for 12 hours and characterized by gel permeation chromatography.

In general, thermally initiated bulk polymerizations were conducted in the presence of 1-phenylvinyl diphenylphosphinate for methyl acrylate, methyl vinyl ketone, methyl methacrylate, N-vinylpyrrolidone, methacrylonitrile and 2-vinylpyridine polymerizations. In these polymerization systems, the initiator and monomer were weighed into a 50 ml borosilicate glass bottle and stirred until dissolved. Aliquots of the initiator/monomer solutions were then transferred to six separate 6 ml borosilicate bottles containing varying quantities of the transfer agent. Each bottle was then capped and sparged with dry nitrogen for 5 minutes. All six reaction bottles were simultaneously immersed in an oil bath maintained at 60±2° C. At the end of a predetermined reaction time (times of polymerization are dependent on the monomer used), all reaction bottles were simultaneously removed from the oil bath. The individual polymers were then isolated by precipitation into non-solvents (again the particular non-solvent used is dependent on the monomer used) followed by drying in a vacuum oven.

The molecular weights of the precipitated poly(methyl acrylate)s, poly(methyl methacrylate)s, and poly(methyl vinyl ketone)s were determined by gel permeation chromatography in THF. The molecular weights of the poly (methacrylonitrile)s were determined by gel permeation chromatography in DMF. Finally, the molecular weights of the poly(2-vinylpyridine)s and poly(N-vinylpyrrolidone)s were determined by intrinsic viscosity measurements.

A common way to represent the effectiveness of a chain transfer agent is to use a Mayo plot. A Mayo plot is a plot of the reciprocal of the number average molecular weights ($\overline{M}_n$) of polymers produced from mixtures of monomer and transfer agent versus the ratio of the molar concentrations of transfer agent and monomer. The mathematical equation for a Mayo plot is $1/\overline{M}_n = 1/\overline{M}_{n,0} + C_T(CT)/(M)$, where $\overline{M}_n$ is the polymer molecular weight, $\overline{M}_{n,0}$ is the polymer molecular weight obtained when no chain transfer agent is present, (CT) is the molar concentration of the monomer transfer agent, (M) is the monomer concentration and $C_T$ is the chain transfer constant that characterizes the relative reactivity of the chain transfer agent toward growing polymer radicals compared to the reactivity of monomer toward such radicals. $C_T$ is measured as the slope of a Mayo plot.

FIG. 12 shows Mayo plots that have been measured for polymerizations of styrene, methyl methacrylate, methyl acrylate, vinyl pyridine, vinyl pyrrolidone, methyl vinyl ketone and methacrylonitrile that employed 1-phenylvinyl diphenylphosphinate as the chain transfer agent. The positive slopes of these plots indicate that 1-phenylvinyl diphenylphosphinate is an effective chain transfer agent for the polymerizations of these monomers. Estimates of the chain transfer constants were calculated from the slopes of the plots of the inverse of the number average degree polymerization ($1/X_n$) versus the ratio of concentrations of transfer agent [S] and monomer [M].

Chain transfer constants ($C_T$) measured from the slopes of such plots are summarized in Table I.

TABLE I

Chain Transfer Constants Measured for 1-Phenylvinyl Diphenylphosphinate at 60° C.

| Monomer | $C_T$ |
| --- | --- |
| methyl methacrylate | 0.147 |
| methyl acrylate | 0.256 |
| vinyl pyridine | 0.018 |
| N-vinyl pyrrolidone | 0.609 |
| methyl vinyl ketone | 0.043 |
| methacrylonitrile | 0.247 |

EXAMPLE 7

Thermal Bulk Polymerization of Methyl Vinyl Ketone (MVK) in the Presence of 1-Phenylvinyl Diphenylphosphinate (1-PVDPP)

2,2'-Azobisisobutyronitrile (AIBN) (57.2 mg, 0.358 mmol) was weighed into a 50 ml borosilicate glass bottle equipped with a magnetic stir bar. Methyl vinyl ketone (MVK) (22.70 g, 324 mmol) was then added to the borosilicate glass bottle. The bottle was capped and its contents stirred until the AIBN had dissolved. Separately, 21.0 mg, 30.6 mg, 39.8 mg, 50.8 mg, and 60.4 mg of 1-phenylvinyl diphenylphosphinate was weighed into six separate 6 ml borosilicate glass bottles, each of which was equipped with a magnetic stir bar. Each bottle was capped with an aluminum crimp top seal containing a Teflon-coated rubber septum. Four milliliters of the MVK/AIBN solution was transferred into each of the six reaction vials by use of a syringe. All six reaction bottles were sparged with dry nitrogen for 5 minutes, and then simultaneously immersed in an oil bath maintained at 60±2° C. At the end of a 40 minute polymerization period, the six reaction vessels were simultaneously removed from the oil bath and the polymers that had formed were isolated by dropwise addition of the individual polymer solutions into diethyl ether, followed by filtration and drying in a vacuum oven at room temperature and 1 mm Hg. The molecular weights of the resulting polymers were determined by gel permeation chromatography using THF as the solvent. The resultant molecular weights are shown in Table II below.

TABLE II

| [1-PVDPP]/[MVK] | Molecular Weight (g/mol) |
| --- | --- |
| 0 | 313,400 |
| 1.36E-03 | 222,300 |
| 1.95E-03 | 204,300 |
| 2.59E-03 | 182,100 |
| 3.30E-03 | 174,200 |
| 3.92E-03 | 184,100 |

EXAMPLE 8

Thermal Bulk Polymerization of Methyl Vinyl Ketone (MVK) in the Presence of 1-Phenylvinyl Diphenylphosphinate (1-PVDPP)

2,2'-Azobisisobutyronitrile (AIBN) (49.9 mg, 0.304 mmol) was weighed into a 50 ml borosilicate glass bottle equipped with a magnetic stir bar. Methyl vinyl ketone (MVK) (21.58 g, 308 mmol) was then added to the bottle. The bottle was capped and its contents stirred until the AIBN had dissolved. Separately, 9.20 mg, 33.7 mg, 76.4 mg, 92.9 mg, and 106.9 mg of 1-phenylvinyl diphenylphosphinate was weighed into six separate 6 ml borosilicate glass bottles, each of which was equipped with a magnetic stir bar. Each bottle was capped with an aluminum crimp top seal containing a Teflon-coated rubber septum. Four milliliters of the MVK/AIBN solution was transferred into each of the six reaction vials by use of a syringe. All six reaction bottles were sparged with dry nitrogen for 5 minutes, and then simultaneously immersed in an oil bath maintained at 60±2° C. At the end of a 40 minute polymerization period, the six reaction vessels were simultaneously removed from the oil bath and the polymers that had formed were isolated by dropwise addition of the individual polymer solutions into diethyl ether, followed by filtration and drying in a vacuum oven at room temperature and 1 mm Hg. The molecular weights of the resulting polymers were determined by gel permeation chromatography using THF as the solvent. The resultant molecular weights are shown in Table III below.

TABLE III

| [1-PVDPP]/[MVK] | Molecular Weight (g/mol) |
| --- | --- |
| 0 | 276,500 |
| 6.00E-04 | 230,500 |
| 2.19E-03 | 204,700 |
| 4.96E-03 | 147,500 |
| 6.95E-03 | 124,400 |

EXAMPLE 9

Thermal Bulk Polymerization of Methyl Methacrylate (MMA) in the Presence of 1-Phenylvinyl Diphenylphosphinate (1-PVDPP)

2,2'-Azobisisobutyronitrile (AIBN) (42.5 mg, 0.258 mmol) was weighed into a 50 ml borosilicate glass bottle equipped with a magnetic stir bar. Methyl methacrylate (MMA) (29.18 g, 291 mmol) was then added to the bottle. The bottle was capped and its contents stirred until the AIBN had dissolved. Separately, 9.8 mg, 24.6 mg, 32.1 mg, 39.2 mg, and 51.4 mg of 1-phenylvinyl diphenylphosphinate was weighed into six separate 6 ml borosilicate glass bottles, each being equipped with a magnetic stir bar. Each bottle was capped with an aluminum crimp top seal containing a Teflon-coated rubber septum. Four milliliters of the MMA/AIBN solution was transferred into each of the six reaction vials by use of a syringe. All six reaction bottles were sparged with dry nitrogen for 5 minutes, and then simultaneously immersed in an oil bath maintained at 60±2° C. At the end of a 62 minute polymerization period, the six reaction vessels were simultaneously removed from the oil bath and the polymers synthesized were isolated by dropwise addition of the individual polymer solutions into hexane, followed by filtration and drying in a vacuum oven at room temperature and 1 mm Hg. The molecular weights of the resulting polymers were determined by gel permeation chromatography using THF as the solvent. The resultant molecular weights are listed in Table IV below.

TABLE IV

| [1-PVDPP]/[MMA] | Molecular Weight (g/mol) |
| --- | --- |
| 0 | 365,600 |
| 8.18E-04 | 255,000 |
| 2.05E-03 | 152,400 |
| 2.68E-03 | 142,500 |
| 3.27E-03 | 131,400 |
| 4.29E-03 | 109,000 |

EXAMPLE 10

Thermal Bulk Polymerization of Methyl Methacrylate (MMA) in the Presence of 1-Phenylvinyl Diphenylphosphinate (1-PVDPP)

2,2'-Azobisisobutyronitrile (AIBN) (44.4 mg, 0.270 mmol) was weighed into a 50 ml borosilicate glass bottle equipped with a magnetic stir bar. Methyl methacrylate (MMA) (28.91 g, 289 mmol) was then added to the bottle. The bottle containing the MMA/AIBN mixture was capped and its contents stirred until the AIBN had dissolved. Separately, 11.1 mg, 21.1 mg, 31.4 mg, 39.7 mg, and 50.7 mg of 1-phenylvinyl diphenylphosphinate was weighed into six separate 6 ml borosilicate glass bottles, each of which was equipped with a magnetic stir bar. Each bottle was capped with an aluminum crimp top seal containing a Teflon-coated rubber septum. Four milliliters of the MMA/AIBN solution was transferred into each of the six reaction vials by use of a syringe. All six reaction bottles were sparged with dry nitrogen for 5 minutes, and then simultaneously immersed in an oil bath maintained at 60±2° C. At the end of a 60 minute polymerization period, the six reaction vessels were simultaneously removed from the oil bath and the polymers synthesized were isolated by dropwise addition of the individual polymer solutions into hexane, followed by filtration and drying in a vacuum oven at room temperature and 1 mmHg. The molecular weights of the resulting polymers were determined by gel permeation chromatography using THF as the solvent. The resultant molecular weights are shown in Table V below.

TABLE V

| [1-PVDPP]/[MMA] | Molecular Weight (g/mol) |
| --- | --- |
| 0 | 353,600 |
| 9.27E-04 | 230,900 |
| 1.76E-03 | 177,500 |
| 2.62E-03 | 156,100 |
| 3.31E-03 | 133,900 |
| 4.25E-03 | 94,400 |

EXAMPLE 11

Thermal Bulk Polymerization of Methyl Acrylate (MA) in the Presence of 1-Phenylvinyl Diphenylphosphinate (1-PVDPP)

2,2'-Azobisisobutyronitrile (AIBN) (50.8 mg, 0.309 mmol) was weighed into a 50 ml borosilicate glass bottle equipped with a magnetic stir bar. Methyl acrylate (MA) (26.55 g, 308 mmol) was then added to the bottle. The bottle containing the MA/AIBN mixture was capped and its contents stirred until the AIBN had dissolved. Separately, 11.1 mg, 21.7 mg, 30.3 mg, 41.0 mg, and 55.2 mg of 1-phenylvinyl diphenylphosphinate was weighed into six separate 6 ml borosilicate glass bottles, each of which was equipped with a magnetic stir bar. Each bottle was capped with an aluminum crimp top seal containing a Teflon-coated rubber septum. Four milliliters of the MA/AIBN solution was transferred into each of the six reaction vials by use of a syringe. All six reaction bottles were sparged with dry nitrogen for 5 minutes, and then simultaneously immersed in an oil bath maintained at 60±2° C. At the end of a 115 minute polymerization period, the six reaction vessels were simultaneously removed from the oil bath and the polymers that had formed were isolated by dropwise addition of the individual polymer solutions into cyclohexane, followed by filtration and drying in a vacuum oven at room temperature and 1 mm Hg. The molecular weights of the resulting polymers were determined by gel permeation chromatography using THF as the solvent. The resultant molecular weights are shown in Table VI below.

TABLE VI

| [1-PVDPP]/[MA] | Molecular Weight (g/mol) |
| --- | --- |
| 7.80E-04 | 161,300 |
| 1.53E-03 | 125,300 |
| 2.13E-03 | 103,200 |
| 2.88E-03 | 82,900 |
| 3.88E-03 | 65,100 |

EXAMPLE 12

Thermal Bulk Polymerization of N-Vinylpyrrolidone (NVP) in the Presence of 1-Phenylvinyl Diphenylphosphinate (1-PVDPP)

2,2'-Azobisisobutyronitrile (AIBN) (46.0 mg, 0.280 mmol) was weighed into a 50 ml borosilicate glass bottle equipped with a magnetic stir bar. N-vinylpyrrolidone (NVP) (31.37 g, 282 mmol) was then added to the bottle. The bottle containing the NVP/AIBN mixture was capped and its contents stirred until the AIBN had dissolved. Separately, 21.5 mg, 31.5 mg, 39.0 mg, 50.6 mg, and 59.2 mg of 1-phenylvinyl diphenylphosphinate was weighed into six separate 6 ml borosilicate glass bottles, each of which was equipped with a magnetic stir bar. Each bottle was capped with an aluminum crimp top seal containing a Teflon-coated rubber septum. Four milliliters of the NVP/AIBN solution was transferred into each of the six reaction vials by use of a syringe. All six reaction bottles were sparged with dry nitrogen for 5 minutes, and then simultaneously immersed in an oil bath maimtained at 60±2° C. At the end of a 150 minute polymerization period, the six reaction vessels were simultaneously removed from the oil bath and the polymers that had formed were isolated by dropwise addition of the individual polymer solutions into cyclohexane, followed by filtration and drying in a vacuum oven at room temperature and 1 mm Hg. The molecular weights of the resulting polymers were determined by intrinsic viscosity measurements in methanol as a solvent at 30° C. The resultant molecular weights are provided in Table VII below.

TABLE VII

| [1-PVDPP]/[NVP] | Molecular Weight (g/mol) |
| --- | --- |
| 0 | 136,580 |
| 1.73E-03 | 62,880 |
| 2.61E-03 | 50,430 |
| 3.35E-03 | 44,070 |
| 4.95E-03 | 28,330 |

EXAMPLE 13

Thermal Bulk Polymerization of Methyacrylonitrile (MAN) in the Presence of 1-Phenylvinyl Diphenylphosphinate (1-PVDPP)

2,2'-Azobisisobutyronitrile (AIBN) (49.3 mg, 0.300 mmol) was weighed into a 50 ml borosilicate glass bottle equipped with a magnetic stir bar. Methacrylonitrile (MAN) (20.16 g, 301 mmol) was then added to the bottle. The bottle containing the MAN/AIBN mixture was capped and its contents stirred until the AIBN had dissolved. Separately, 19.8 mg, 30.7 mg, 42.5 mg, 49.7 mg, and 63.0 mg of 1-phenylvinyl diphenylphosphinate was weighed into six separate 6 ml borosilicate glass bottles, each of which was equipped with a magnetic stir bar. Each bottle was capped with an aluminum crimp top seal containing a Teflon-coated rubber septum. Four milliliters of the MAN/AIBN solution was transferred into each of the six reaction vials by use of a syringe. All six reaction bottles were sparged with dry nitrogen for 5 minutes, and then simultaneously immersed in an oil bath maintained at 60±2° C. At the end of a 135 minute polymerization period, the six reaction vessels were simultaneously removed from the oil bath and the polymers that had formed were isolated by dropwise addition of the individual polymer solutions into hexane, followed by filtration and drying in a vacuum oven at room temperature and 1 mm Hg. The molecular weights of the resulting polymers were determined by gel permeation chromatography using DMF as a solvent and a calibration based on monodisperse poly(methyl methacrylate) standards. The resultant molecular weights are provided in Table VII below.

TABLE VIII

| [1-PVDPP]/[MAN] | Molecular Weight (g/mol) |
| --- | --- |
| 0 | 20,130 |
| 1.30E-03 | 18,280 |
| 2.01E-03 | 17,780 |
| 2.78E-03 | 17,690 |
| 3.25E-03 | 16,180 |

EXAMPLE 14

Thermal Bulk Polymerization of 2-Vinylpyridine (2VP) in the Presence of 1-Phenylvinyl Diphenylphosphinate (1-PVDPP)

2,2'-Azobisisobutyronitrile (AIBN) (35.9 mg, 0.219 mmol) was weighed into a 50 ml borosilicate glass bottle equipped with a magnetic stir bar. 2-vinylpyridine (2VP) (23.11 g, 219 mmol) was then added to the bottle. The bottle containing the 2VP/AIBN mixture was capped and its contents stirred until the AIBN had dissolved. Separately, 14.5 mg, 31.6 mg, 55.1 mg, 69.6 mg, and 83.3 mg of 1-phenylvinyl diphenylphosphinate was weighed into six separate 6 ml borosilicate glass bottles, each of which was equipped with a magnetic stir bar. Each bottle was capped with an aluminum crimp top seal containing a Teflon-coated rubber septum. Four milliliters of the 2VP/AIBN solution was transferred into each of the six reaction vials by use of a syringe. All six reaction bottles were sparged with dry nitrogen for 5 minutes, and then simultaneously immersed in an oil bath maintained at 60±2° C. At the end of a 45 minute polymerization period, the six reaction vessels were simultaneously removed from the oil bath and the polymers that had formed were isolated by dropwise addition of the individual polymer solutions into dioxane, followed by filtration and drying in a vacuum oven at room temperature and 1 mm Hg. The molecular weights of the resulting polymers were determined by intrinsic viscosity measurements using benzene as a solvent at 25° C. The resultant molecular weights are provided in Table IX below.

TABLE IX

| [1-PVDPP]/[2VP] | Molecular Weight (g/mol) |
| --- | --- |
| 1.22E-03 | 320,700 |
| 2.66E-03 | 312,600 |
| 4.64E-03 | 262,700 |
| 5.86E-03 | 257,600 |
| 7.01E-03 | 252,900 |

EXAMPLE 15

Thermal Bulk Polymerization of Methyl Methacrylate (MMA) in the Presence of 1-Phenylvinyl Methyl Phenylphosphonate (1-PVMPP)

2,2'-Azobisisobutyronitrile (AIBN) (46.1 mg, 0.281 mmol) was weighed into a 50 ml borosilicate glass bottle equipped with a magnetic stir bar. Methyl methacrylate (MMA) (28.82 g, 288 mmol) was then added to the bottle. The bottle containing the MMA/AIBN mixture was capped and its contents stirred until the AIBN had dissolved. Separately, 12.9 mg, 26.7 mg, 30.4 mg, 43.9 mg, and 55.6 mg of 1-phenylvinyl methyl phenylphosphonate was weighed into six separate 6 ml borosilicate glass bottles, each of which was equipped with a magnetic stir bar. Each bottle was capped with an aluminum crimp top seal containing a Teflon-coated rubber septum. Four milliliters of the MMA/AIBN solution was transferred into each of the six reaction vials by use of a syringe. All six reaction bottles were sparged with dry nitrogen for 5 minutes, and then simultaneously immersed in an oil bath maintained at 60±2° C. At the end of a 60 minute polymerization period, the six reaction vessels were simultaneously removed from the oil bath and the polymers that had formed were isolated by dropwise addition of the individual polymer solutions into hexane, followed by filtration and drying in a vacuum oven at room temperature and 1 mm Hg. The molecular weights of the resulting polymers were determined by gel permeation chromatography using THF as a solvent. The resultant molecular weights are provided in Table X below.

TABLE X

| [1-PVMPP]/[MMA] | Molecular Weight (g/mol) |
| --- | --- |
| 0 | 361,000 |
| 1 25E-03 | 157,700 |
| 2.59E-03 | 120,500 |
| 2.94E-03 | 113,400 |
| 4.25E-03 | 84,900 |
| 5.38E-03 | 80,200 |

EXAMPLE 16

Thermal Bulk Polymerization of Methyl Methacrylate (MMA) in the Presence of 1-Phenylvinyl Dimethylphosphate (1-PVDMP)

2,2'-Azobisisobutyronitrile (AIBN) (48.9 mg, 0.298 mmol) was weighed into a 50 ml borosilicate glass bottle equipped with a magnetic stir bar. Methyl methacrylate (MMA) (29.00 g, 290 mmol) was then added to the bottle. The bottle containing the MMA/AIBN mixture was capped and its contents stirred until the AIBN had dissolved. Separately, 13.0 mg, 33.1 mg, 40.4 mg, and 53.9 mg of 1-phenylvinyl dimethylphosphate was weighed into six separate 6 ml borosilicate glass bottles, each of which was equipped with a magnetic stir bar. Each bottle was capped with an aluminum crimp top seal containing a Teflon-coated rubber septum. Four milliliters of the MMA/AIBN solution was transferred into each of the six reaction vials by use of a syringe. All six reaction bottles were sparged with dry nitrogen for 5 minutes, and then simultaneously immersed in an oil bath maintained at 60±2° C. At the end of a 60 minute polymerization period, the six reaction vessels were simultaneously removed from the oil bath and the polymers that had formed were isolated by dropwise addition of the individual polymer solutions into hexane, followed by filtration and drying in a vacuum oven at room temperature and 1 mm Hg. The molecular weights of the resulting polymers were determined by gel permeation chromatography using THF as a solvent. The resultant molecular weights are provided in Table XI below.

TABLE XI

| [1-PVDMP]/[MMA] | Molecular Weight (g/mol) |
| --- | --- |
| 0 | 318,900 |
| 2.57E-03 | 119,100 |
| 3.88E-03 | 110,800 |
| 4.74E-03 | 91,500 |
| 6.32E-03 | 74,000 |

Based upon the foregoing disclosure, it should now be apparent that the chain transfer agents and the use thereof as described herein will carry out the objects set forth hereinabove. It is, therefore, to be understood that any variations evident fall within the scope of the claimed invention. For example, the selection of specific component substituents of the chain transfer agent can be determined without departing from the spirit of the invention herein disclosed and described. Indeed, the organic groups or moieties according to the present invention are not necessarily limited to those having alkyl groups, or simply carbon atoms. Furthermore, the compounds of the present invention are only preferably prepared by the Perkov reaction, and the skilled artisan can select other synthetic procedures to prepare the compounds. Thus, the scope of the invention shall include all modifications and variations that may fall within the scope of the attached claims. Also, it should be understood that the various chemical compounds that have been drawn throughout this specification are provided to further the reader's understanding of the chemical substituents of the compounds, but it should be understood that the structures that are drawn may not be stereochemically correct and therefore the reader should not limit the scope of the invention based upon the two dimensional drawings that are provided.

What is claimed is:

1. A method for making a polymer comprising a step of synthesizing a polymer by employing a chain transfer agent that is a macrofer and is defined according to the formula (IX)

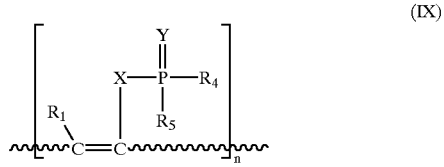

(IX)

where X and Y are independently selected from oxygen, sulfur, and fully-substituted nitrogen, $R_1$ is selected from hydrogen or halogen, $R_4$ and $R_5$ are independently selected organic groups, and where n is one to about 5000, and ⌇⌇⌇ is a polymeric structure.

2. A method for making a polymer comprising the step of:
synthesizing a polymer by employing a chain transfer agent that is a macrofer and is defined according to the formula (VI)

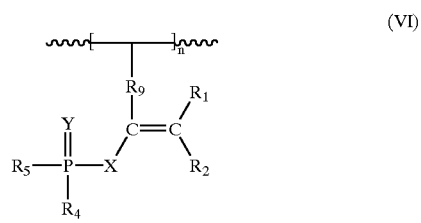

(VI)

where X and Y are independently selected from oxygen, sulfur, and fully-substituted nitrogen, where $R_1$ and $R_2$ are independently selected from hydrogen, halogen, or an organic group, with the proviso that at least one of $R_1$ or $R_2$ be hydrogen or halogen, $R_4$ and $R_5$ are independently selected organic groups, $R_9$ is selected from the group consisting of a bond, a divalent atom and a divalent moiety, n is one to about 5000, and ~~~ is a polymeric structure.

3. A method for making a polymer comprising the step of:
synthesizing a polymer by employing a chain transfer agent that is a macrofer and is defined according to the formula (VII)

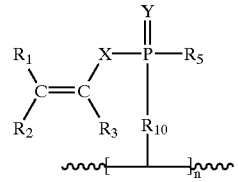

(VII)

where X and Y are independently selected from oxygen, sulfur, and fully-substituted nitrogen, $R_1$ and $R_2$ are independently selected from hydrogen, halogen, or an organic group, with the proviso that at least one of $R_1$ or $R_2$ be hydrogen or halogen, $R_3$ is selected from the group consisting of vinyl groups, substituted vinyl groups, phenyl groups, substituted phenyl groups, naphthyl groups, substituted naphthyl groups, ester groups, ketone groups, aldehyde groups, heterocyclic groups, amide groups, and carboxylic acid groups, $R_5$ is an organic group, and where $R_{10}$ is selected from the group consisting of a bond, a divalent atom, and a divalent moiety, n is one to about 5000, and ~~~ is a polymeric structure.

4. A method for making a polymer comprising the step of:
synthesizing a polymer by employing a chain transfer agent that is a macrofer and is defined according to the formula (VIII)

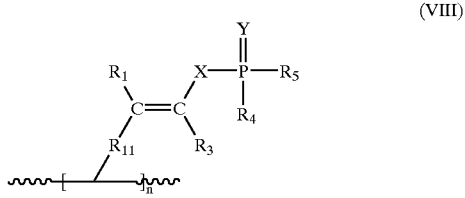

(VIII)

where X and Y are independently selected from oxygen, sulfur, and fully-substituted nitrogen, $R_1$ is hydrogen, $R_3$ is selected from the group consisting of vinyl groups, substituted vinyl groups, phenyl groups, substituted phenyl groups, naphthyl groups, substituted naphthyl groups, ester groups, ketone groups, aldehyde groups, heterocyclic groups, amide groups, and carboxylic acid groups, $R_4$ and $R_5$ are independently selected organic groups, where $R_{11}$ is selected from the group consisting of a bond, a divalent atom, and a divalent moiety, n is one to about 5000, and ~~~ is a polymeric structure.

* * * * *